US012646630B2

(12) United States Patent
Yi et al.

(10) Patent No.: US 12,646,630 B2
(45) Date of Patent: Jun. 2, 2026

(54) PASSIVE COOLING SYSTEM FOR NUCLEAR REACTOR AND METHOD FOR OPERATING THE SAME

(71) Applicant: KOREA ATOMIC ENERGY RESEARCH INSTITUTE, Daejeon (KR)

(72) Inventors: Sung Jae Yi, Chungcheongnam-do (KR); Hyun Sik Park, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 286 days.

(21) Appl. No.: 18/264,291

(22) PCT Filed: Sep. 24, 2021

(86) PCT No.: PCT/KR2021/013040
§ 371 (c)(1),
(2) Date: Aug. 4, 2023

(87) PCT Pub. No.: WO2022/186436
PCT Pub. Date: Sep. 9, 2022

(65) Prior Publication Data

US 2024/0304346 A1 Sep. 12, 2024

(30) Foreign Application Priority Data

Mar. 4, 2021 (KR) ........................ 10-2021-0028554

(51) Int. Cl.
*G21C 15/18* (2006.01)
*G21C 15/12* (2006.01)
*G21C 15/243* (2006.01)

(52) U.S. Cl.
CPC ............ *G21C 15/18* (2013.01); *G21C 15/12* (2013.01); *G21C 15/243* (2013.01)

(58) Field of Classification Search
CPC ...... G21C 15/18; G21C 15/12; G21C 15/243; G21C 15/02; Y02E 30/30
See application file for complete search history.

(56) References Cited

U.S. PATENT DOCUMENTS 5,215,708 A * 6/1993 Fennern .................. G21D 1/00 376/293
2013/0202075 A1* 8/2013 Kwon ...................... G21D 1/02 376/298

(Continued)

FOREIGN PATENT DOCUMENTS

EP 0 353 867 A1 2/1990
EP 3492811 A1 6/2019

(Continued)

OTHER PUBLICATIONS

International Search Report issued in Patent Application No. PCT/KR2021/013040 dated Jan. 4, 2022.

(Continued)

*Primary Examiner* — Angelo Trivisonno
(74) *Attorney, Agent, or Firm* — Hauptman Ham, LLP

(57) ABSTRACT

Passive cooling systems and methods, in which an infinite cooling circulation occurs by itself while cooling water is passively circulated without separate operation and control of an operator and supply of an external power source in the event of an abnormality in a nuclear reactor. The passive cooling system includes an energy release space; an energy absorbing space to which a pressure in the energy release space is transferred; an energy transfer space which absorbs and cools heat transferred from the nuclear reactor vessel as the cooling water; an emergency cooling flow passage for transferring heat to the energy transfer space; a reactor thermal insulation vessel; a pressure equalization pipe to transfer water vapor and pressure in the reactor thermal insulation vessel to the energy absorbing space; and a (Continued)

coolant spray pipe for flowing pressurized cooling water by the pressure equalization pipe to the energy transfer space.

16 Claims, 15 Drawing Sheets

(56) References Cited

U.S. PATENT DOCUMENTS

| | | | | |
|---|---|---|---|---|
| 2014/0334591 | A1* | 11/2014 | Kim | G21C 13/02 376/282 |
| 2015/0131769 | A1* | 5/2015 | Larrion | B66B 11/0492 376/282 |
| 2016/0042816 | A1* | 2/2016 | Yi | G21C 15/18 376/283 |
| 2018/0061514 | A1* | 3/2018 | Yi | G21C 15/12 |

FOREIGN PATENT DOCUMENTS

| | | | |
|---|---|---|---|
| JP | 2015-078847 | A | 4/2015 |
| JP | 2017-032594 | A | 2/2017 |
| KR | 10-1502395 | B1 | 3/2015 |
| KR | 10-1564553 | B1 | 11/2015 |
| KR | 10-1619075 | B1 | 5/2016 |

OTHER PUBLICATIONS

The Extended European Search Report dated Nov. 22, 2024 for corresponding European Patent Application No. 21929298.4 (7 pages).

* cited by examiner

PASSIVE COOLING SYSTEM FOR NUCLEAR REACTOR AND METHOD FOR OPERATING THE SAME

CROSS-REFERENCE TO RELATED APPLICATIONS

This is a National Stage application of PCT international application PCT/KR2021/013040, filed on Sep. 24, 2021, which claims the priority of Korea Patent Application 10-2021-0028554, filed Mar. 4, 2021, both of which are incorporated herein by reference in their entirety.

TECHNICAL FIELD

The present invention relates to a passive cooling system for nuclear reactor and a method for operating the same, and more particularly, to the passive cooling system for the nuclear reactor and the method for operating the same, in which an infinite cooling circulation occurs by itself while cooling water is passively circulated without separate operation and control of an operator and supply of an external power source in the event of an abnormality in a nuclear reactor.

BACKGROUND ART

Atomic power generation is a method in which a turbine is operated by using energy generated during nuclear fission to produce electrical energy, and it is adopted and operated in various countries as one of the power generation methods because it does not generate carbon dioxide during power generation and can produce massive electricity as a small amount of fuel.

This nuclear power generation is necessary for cooling due to the generation of heavy heat, and as shown in FIG. 1, the general nuclear power generation has a cooling circulation such that the massive thermal energy generated as the reactor core 20 in the reactor 10 fissions is transferred to the cooling water in the nuclear reactor 10, and the heated cooling water is converted to electrical energy through the generator 54 by turning the turbine 52 in the form of water vapor and then condensed back into water and circulated back into the reactor 10, thereby cooling the reactor 10.

In such a nuclear reactor, massive thermal energy is generated, and the heat of such a reactor is usually properly cooled, but large accidents may occur in which the reactor facility itself is destroyed when an unexpected accident or the like occurs and the heating of the reactor is not properly cooled which may result in a very dangerous situation which may cause radioactive pollution of the environment in addition to the loss of the facility.

Thus, various safety systems for cooling the nuclear reactor in an emergency situation are essentially provided. These safety systems are provided in the form of a supplemental supply of coolant to each part of the nuclear reactor and in the form of appropriately circulating the coolant to discharge the recovered heat to the outside through the heat sink.

Such a heat sink is in the form of a heat exchanger for discharging only heat without leakage of cooling water therein, and such a heat exchanger can discharge heat by being immersed in water such as seawater or river for heat exchange.

The form in which the heat exchanger is immersed in the refrigerant (water) is referred to as Pool Boiling, and there is a problem that the heat exchange of this pool boiling mode has a heat transfer rate that is not satisfactory, so that the rate of releasing heat may be slower than the rate at which the nuclear reactor generates heat, and thus the entire equipment must be increased.

In addition, existing nuclear reactors are configured to operate by operation of an operator according to a manual when an emergency situation occurs, but there are problems in that in the event of a major accident, the operator may also be injured, killed or evacuated, resulting in the absence of the operator to operate and there may occur a situation in which the manual is too complex to be trained and the operator cannot block the accident due to the operator's mistake in operation in an emergency situation.

DISCLOSURE

Technical Problem

The present invention has been made to solve the above-mentioned problems, and is directed to providing a passive cooling system for nuclear reactor and a method for operating the same, in which cooling water is passively circulated by heat and pressure generated in the event of an abnormality in the nuclear reactor while an infinite cooling circulation occurs in the reactor itself, so that separate operation of an operator is not required, supply of an external power source can be minimized, and a speed at which heat is discharged is high, thereby reducing the size of the entire cooling system and improving safety.

The technical problems of the present invention are not limited to the technical problems mentioned above, and other technical problems not mentioned will be clearly understood by those of ordinary skill in the art from the following description.

Technical Solution

One aspect of the present invention is directed to providing a passive cooling system for nuclear reactor, the system including: an energy release space in which a nuclear reactor containing a reactor core is located; an energy absorbing space which is partitioned from the energy release space and which accommodates cooling water, and to which a pressure in the energy release space is transferred; an energy transfer space which is provided above the energy absorbing space and into which cooling water of the energy absorbing space flows, and which absorbs and cools heat transferred from the nuclear reactor vessel as the cooling water; an emergency cooling flow passage for transferring heat of the nuclear reactor to the energy transfer space; a reactor thermal insulation vessel spaced from the nuclear reactor and formed to surround an upper side and a circumference of the nuclear reactor; a pressure equalization pipe that communicates the reactor thermal insulation vessel and the energy absorbing space to transfer water vapor and pressure in the reactor thermal insulation vessel to the energy absorbing space; a coolant spray pipe for flowing pressurized cooling water in the energy absorbing space by the pressure equalization pipe to the energy transfer space; wherein the energy transfer space comprises a saturated vapor pressure cooling chamber formed adjacent to an inner surface of the energy transfer space and forming a space in which a second heat exchanger of the emergency cooling flow passage and a cooling water discharge end of the coolant spray pipe are located and which is filled with cooling water flowing from the cooling water discharge end; and a reference pressure chamber which is formed to be spaced inward from an inner surface of the saturated vapor pressure cooling chamber, a lower side of which communicates with the saturated vapor pressure chamber, and which is filled with air to achieve a pressure balance with cooling water of the saturated vapor pressure cooling chamber, a water level of which changes in accordance with a pressure in the saturated vapor pressure cooling chamber; and wherein a siphon cooling water recirculation pipe for guiding the cooling water in the reference pressure chamber into the reactor thermal insulation vessel is provided, and wherein the siphon cooling water recirculation pipe is formed in an inverted U-shape in which a suction end of the upper side thereof is located in the reference pressure chamber and a discharge end of the lower side thereof is located at the lower side of the reactor thermal insulation vessel, and the suction end is directed downward, extends upward from the suction end, and then is bent and extended downward.

The energy absorbing space and the energy transfer space may be located adjacent to one side of the energy release space.

The energy absorbing space and the energy transfer space may be formed to surround the outer circumference of the energy release space, and the energy release space may be located inside the energy absorbing space and the energy release space.

In addition, another aspect of the present invention discloses a passive cooling system for nuclear reactor, the system including: an energy release space in which a nuclear reactor containing a reactor core is located; an energy absorbing space which is partitioned from the energy release space and which is formed to surround an outer circumference of the energy release space, and which accommodates cooling water, and to which a pressure in the energy release space is transferred; an energy transfer space which is provided above the energy absorbing space and which is formed to surround an outer circumference of the energy release space, and into which cooling water of the energy absorbing space flows, and which absorbs and cools heat transferred from the nuclear reactor vessel as the cooling water, wherein the energy release space is formed to be surrounded by the energy absorbing space and the energy transfer space, the system further including: an emergency cooling flow passage for transferring heat of the nuclear reactor to the energy transfer space; a reactor thermal insulation vessel spaced from the nuclear reactor and formed to surround an upper side and a circumference of the nuclear reactor; a pressure equalization pipe that communicates the reactor thermal insulation vessel and the energy absorbing space to transfer water vapor and pressure in the reactor thermal insulation vessel to the energy absorbing space; and a coolant spray pipe for flowing pressurized cooling water in the energy absorbing space by the pressure equalization pipe to the energy transfer space.

The energy transfer space may include a saturated vapor pressure cooling chamber formed adjacent to an inner surface of the energy transfer space and forming a space in which a second heat exchanger of the emergency cooling flow passage and a cooling water discharge end of the coolant spray pipe are located and which is filled with cooling water flowing from the cooling water discharge end; and a reference pressure chamber which is formed to be spaced inward from an inner surface of the saturated vapor pressure cooling chamber, a lower side of which communicates with the saturated vapor pressure chamber, and which is filled with air to achieve a pressure balance with cooling water of the saturated vapor pressure cooling chamber, a water level of which changes in accordance with a pressure in the saturated vapor pressure cooling chamber, wherein a portion of the energy release space is located inside the reference pressure chamber.

The energy absorbing space may include a cooling water storage tank positioned below the reference pressure chamber and storing cooling water; and a lower cylinder which is formed on the upper side of the cooling water storage tank, form a space in which water vapor of the nuclear reactor thermal insulation vessel delivered through the pressure equalization pipe is condensed, and extend a certain distance from the upper side toward the lower side of the energy absorbing space at a position spaced inward by a predetermined distance from a side wall of the cooling water storage tank to form a pressurization space that applies pressure so that cooling water in the cooling water storage tank flows through the coolant spray pipe to the energy transfer space by the pressure of the water vapor, and the lower side thereof communicates with the cooling water storage tank.

Alternatively, the energy absorbing space may include a cooling water storage tank positioned below the reference pressure chamber and storing cooling water; and a lower cylinder which is formed on the upper side of the cooling water storage tank, form a space in which water vapor of the nuclear reactor thermal insulation vessel delivered through the pressure equalization pipe is condensed, and extend a certain distance from the upper side toward the lower side of the energy absorbing space at a position spaced inward by a predetermined distance from a side wall of the cooling water storage tank to form a pressurization space that applies pressure so that cooling water in the cooling water storage tank flows through the coolant spray pipe to the energy transfer space by the pressure of the water vapor, and the lower side thereof communicates with the cooling water storage tank, wherein a portion of the energy release space is located in the cooling water storage tank and the lower cylinder.

A siphon cooling water recirculation pipe for guiding the cooling water in the reference pressure chamber into the reactor thermal insulation vessel may be provided, and the siphon cooling water recirculation pipe may be formed in an inverted U-shape in which a suction end of the upper side thereof is located in the reference pressure chamber and a discharge end of the lower side thereof is located at the lower side of the reactor thermal insulation vessel, and the suction end is directed downward, extends upward from the suction end, and then is bent and extended downward.

In addition, the emergency cooling flow passage may include a first heat exchanger that absorbs heat in the nuclear reactor vessel; and a second heat exchanger provided in the saturated vapor pressure cooling chamber and configured to release heat absorbed in the first heat exchanger, wherein an outlet end of the coolant spray pipe is configured to spray cooling water in the energy absorbing space to the second heat exchanger.

The energy absorbing space may further include a vapor induction path securing pipe body for securing a vapor flow path through which the water vapor in the pressurization space moves between the lower cylinder and the inner surface of the cooling water storage tank.

The vapor induction path securing pipe body may be formed to extend downward more than the lower end of the lower cylinder in a state of being spaced apart by a predetermined distance from the outer circumference surface of the lower cylinder at the outside of the lower cylinder, and to extend upward while being spaced apart by a predetermined distance from the inner circumference surface of the lower cylinder after being bent from the lower side of the lower cylinder toward the inside of the lower cylinder, and to secure a vapor flow path between the lower cylinder and thereof.

The system may further include a heat discharge flow passage provided in the saturated vapor pressure cooling chamber to discharge heat inside the saturated vapor pressure cooling chamber to the outside of the energy transfer space, wherein the cooling water sprayed from the coolant spray pipe may absorb heat discharged from the second heat exchanger and be vaporized, and the vaporized water may be cooled and condensed in the heat discharge flow passage and the heat may be transferred by two-phase heat transfer mechanism.

The heat discharge flow passage may include a third heat exchanger provided in the saturated vapor pressure cooling chamber and for absorbing the heat of the saturated vapor pressure cooling chamber heated by the emergency cooling flow passage, and a refrigerant pipe that guides the external refrigerant to the third heat exchanger and discharges the heated refrigerant in the third heat exchanger to the outside.

The refrigerant may be seawater or freshwater.

The system may further include a siphon air discharge pipe formed to discharge a gas in the siphon cooling water recirculation pipe to the reference pressure chamber, a discharge end thereof being located higher than the uppermost end of the siphon cooling water recirculation pipe.

The system may further include a blocking wall that partitions a space between a side surface of the reactor thermal insulation vessel on the upper side of the discharge end of the siphon cooling water recirculation pipe and an inner surface of the energy release space to block cooling water from flowing into the space between the side surface of the reactor thermal insulation vessel and the inner surface of the energy release space; and an air release valve provided in the blocking wall and configured to release non-condensed gas inside the space surrounded by the reactor thermal insulation vessel and the blocking wall to the energy release space.

The system may further include a starting cooling water supply unit disposed on the upper side of the reactor thermal insulation vessel and configured to supply a predetermined amount of cooling water into the reactor thermal insulation vessel when the temperature and the pressure in the energy release space are increased by a certain amount or more.

The starting cooling water supply unit may include a water tank in which cooling water is stored; a siphon path configured to have an inlet end at which the cooling water of the water tank is introduced, located at the lower side of the water tank, to extend upward from the inlet end and then be bent and extended downward, and to have a discharge end from which the cooling water is discharged, inside the reactor thermal insulation vessel; and a starting valve that closes or opens the water tank to communicate with air to be supplied.

The emergency cooling flow passage may further include a vapor release valve for selectively discharging water vapor in the emergency cooling flow passage into the reactor thermal insulation vessel in order to increase the pressure in the reactor thermal insulation vessel.

A cross-sectional area between the cooling water storage tank and the lower cylinder may be formed to be smaller than a cross-sectional area within the lower cylinder.

In addition, yet another aspect of the present invention discloses a method for operating a passive cooling system for a nuclear reactor, the method including: a pressure rising step in which the temperature and pressure in a reactor thermal insulation vessel provided in an energy release space raised above a set value due to the temperature rise in the reactor thermal insulation vessel; a cooling step in which heat of a nuclear reactor is transferred to an energy transfer space through an emergency cooling flow passage and is cooled by cooling water in the energy transfer space; a pressure transition step in which water vapor pressure in the reactor thermal insulation vessel provided in the energy release space is transferred to an energy absorbing space through a pressure equalization pipe; a first cooling water rising step in which, by water vapor pressure in the energy absorbing space raised by the above pressure transition step, cooling water in the energy absorbing space is raised and moved through a coolant spray pipe to a saturated vapor pressure cooling chamber in which the emergency cooling flow passage is located; a second cooling water rising step in which cooling water introduced in the first cooling water rising step flows into the reference pressure chamber to raise the water level inside the reference pressure chamber; a cooling water circulation step in which, when the water level of the cooling water flowing into the reference pressure chamber in the second cooling water rising step becomes higher than a siphon cooling water recirculation pipe, cooling water is injected to the reactor thermal insulation vessel by the siphon cooling water recirculation pipe; and a cooling water condensing step in which cooling water injected to the reactor thermal insulation vessel in the above cooling water circulation step is vaporized and expanded by heat of the nuclear reactor to raise water vapor pressure, and the pressurized water vapor is moved by the pressure equalization pipe to the energy absorbing space, and then condensed.

In the above cooling step, the cooling water may be vaporized by the heat transferred through the emergency cooling flow passage, and the vaporized cooling water may be cooled and condensed by a heat discharge flow passage and the heat may be transferred by two-phase heat transfer mechanism.

The method may further include a starting pressure forming step for forming a predetermined amount of water vapor pressure into the reactor thermal insulation vessel when the temperature and pressure in the reactor thermal insulation vessel are raised in the pressure rising step.

The starting pressure forming step may be a step in which a starting valve of a starting cooling water supply unit is opened to inject cooling water stored in a water tank of the start cooling water supply unit into the reactor thermal insulation vessel and the injected cooling water is vaporized and expanded by heat of the nuclear reactor to form the water vapor pressure.

The starting pressure forming step may be a step in which the water vapor pressure is formed by opening a vapor release valve to release water vapor in the emergency cooling flow passage into the reactor thermal insulation vessel.

The method may further include an air release step in which an air release valve is opened to release non-condensed gas inside the reactor thermal insulation vessel to the energy release space.

Advantageous Effects

According to the passive cooling system for nuclear reactor and the method operating the same of the present invention, the following effects are obtained:

First, the circulation of the cooling water may naturally occur due to the heat and pressure generated in the nuclear reactor, so that there is no need for separate operation of an operator, and the supply of external power is minimized, and thus it is possible to operate itself even if the operator's evacuation or injury occurs, or the power supplied to the cooling system is cut off, thereby improving the safety.

Second, the heat transfer speed can be dramatically improved by using the two-phase heat transfer mechanism instead of the full boiling mode, and thus the cooling performance can be improved, thereby improving the safety.

Third, by providing the saturated vapor pressure cooling chamber adjacent to the outer wall of the energy transfer space in which the two-phase heat transfer mechanism occurs, the heat of the saturated vapor pressure cooling chamber can be conducted to the outside through the outer walls, thereby improving the cooling efficiency.

Fourth, since cooling water is always present on the inner surfaces of the energy absorbing space and the energy transfer space that are in contact with the energy release space in a high temperature state, cooling by heat conduction can be simultaneously performed in addition to cooling by circulation of the cooling water.

Fifth, if the installation of the valve is minimized, an infinite cooling circulation is possible so that the possibility of occurrence of a malfunction can be minimized.

The effects of the present invention are not limited to those mentioned above, and other effects not mentioned will be clearly understood by those of ordinary skill in the art from the description of the claims.

DESCRIPTION OF DRAWINGS

The summary set forth above as well as the detailed description of the preferred embodiments of the present application set forth below may be better understood when read in conjunction with the accompanying drawings. Preferred embodiments are shown in the drawings for the purpose of illustrating the present invention. It should be understood, however, that this application is not limited to the precise arrangement and means illustrated.

BEST MODE

Figure 1:
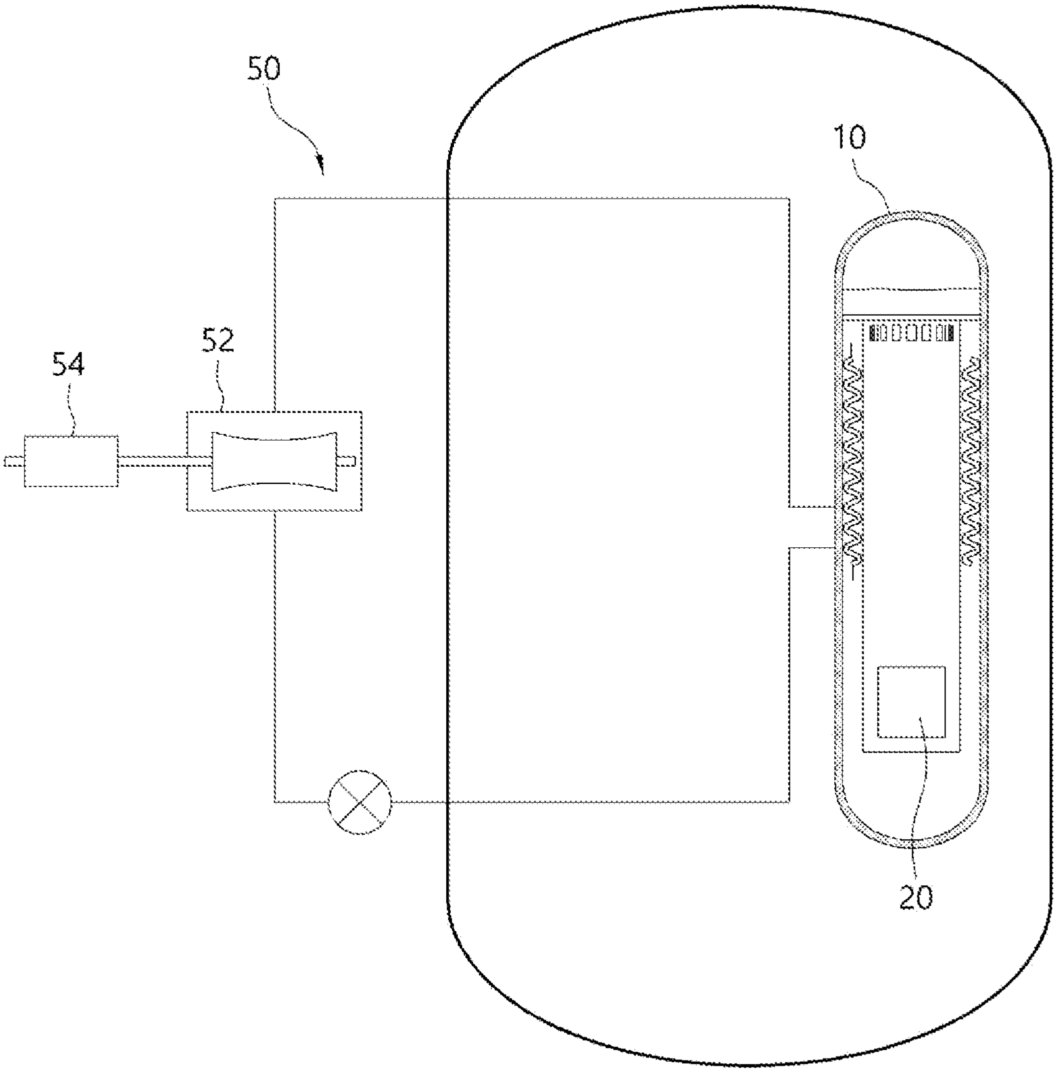
FIG. 1 shows a simplified representation of a conventional nuclear reactor.

Hereinafter, preferred embodiments of the present invention, in which the objects of the invention may be specifically realized, will now be described with reference to the accompanying drawings. In describing the present embodiment, the same elements are designated by the same names and the same reference numerals, and further explanation thereof is omitted.

Hereinafter, an embodiment of a passive cooling system for a nuclear reactor of the present invention will be described.

Figure 2:
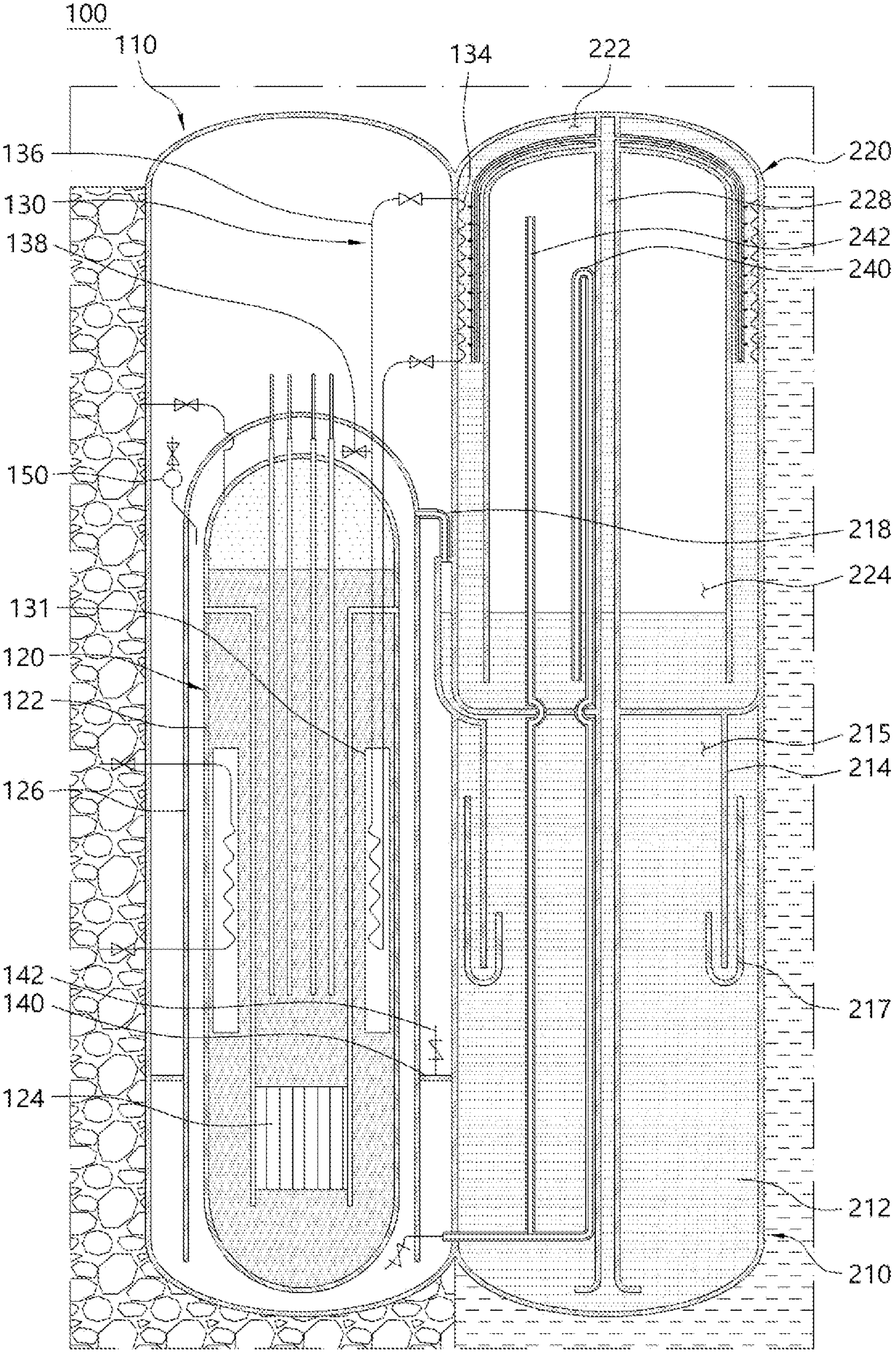
FIG. 2 shows a passive cooling system for a nuclear reactor according to an embodiment of the present invention.
Figure 3:
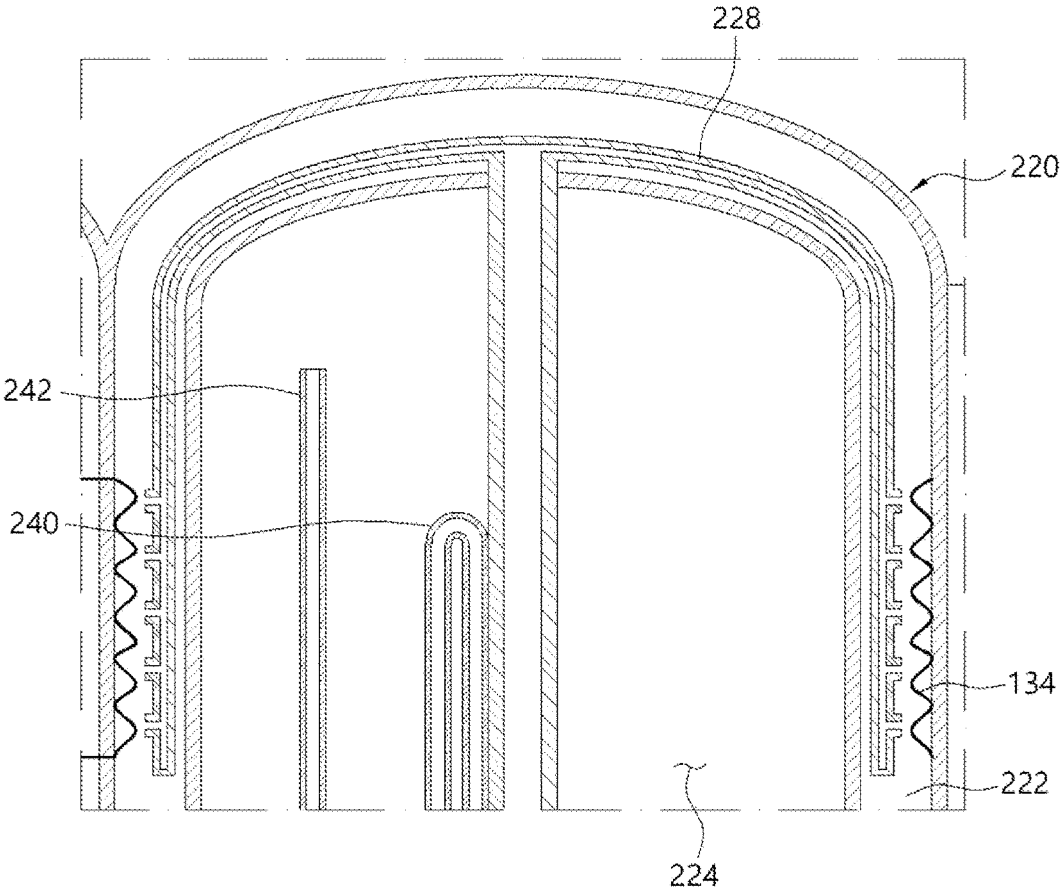
FIG. 3 is an enlarged view of a portion of FIG. 2.

The passive cooling system 100 for the nuclear reactor according to the present embodiment may include an energy release space 110, an energy absorbing space 210, and an energy transfer space 220, as shown in FIG. 2.

The energy release space (ERS) 110 accommodates a reactor drive system 120. The reactor drive system 120 may generate steam using the heat generated from a nuclear reactor 122 which houses a reactor core 124 and from the reactor core 124, and may include a steam generator and a flow path etc. provided inside the nuclear reactor 122 to circulate the generated steam to an external turbine provided for power generation or the like.

In addition, the energy release space 110 may be provided with a reactor thermal insulation vessel 126. The reactor thermal insulation vessel 126 is provided in the energy release space 110 and may be formed to surround the upper side and the circumference of the nuclear reactor at a distance from the nuclear reactor 122. The reactor thermal insulation vessel 126 may be provided to primarily shield heat generated by the nuclear reactor 122 from being radiated directly to the energy release space 110 such that the heat and pressure are increased within the reactor thermal insulation vessel 126. Further, the lower side of the reactor thermal insulation vessel 126 may be formed to be opened and communicate with the energy release space 110.

The energy absorbing space (EAS) 210 may accommodate a coolant, and be configured such that it is partitioned from the energy release space 110 and is in communication with the energy release space 110 at an upper side thereof so that a pressure of the energy release space 110 is transferred to the energy absorbing space 210. In this case, the coolant may be of various types, typically water. In the description of the present embodiment, it will be described by an example of using water as the coolant, and water used as the coolant is referred to as cooling water in the following description. However, the present invention does not necessarily require the use of water as the coolant, and other known types of media may be used as coolant. Of course, the water includes seawater and fresh water.

The energy transfer space (ETS) 220 is isolated from the energy release space 110 and the energy absorbing space 210, and is particularly provided above the energy absorbing space 210 to absorb and cool the heat generated from the nuclear reactor 122 of the energy release space 110, and to transfer the absorbed heat to the outside to dissipate heat. This heat dissipation can be achieved through the outer walls of the energy absorbing space 210 and the energy transfer space 220.

In addition, the energy absorbing space 210 and the energy transfer space 220 may be installed adjacent to the sea or river and constructed to be in contact with seawater or fresh water or to be in contact with atmospheric air. Of course, they are not limited thereto, and may be installed in various places, such as being installed in a transportation means such as a ship or a floating marine object.

Meanwhile, an emergency cooling flow passage 130 may be provided. The emergency cooling flow passage 130 is a component that transfers heat of the nuclear reactor 122 to the energy transfer space 220, and may include a first heat exchanger 132 that absorbs heat in the nuclear reactor 122, a second heat exchanger 134 that dissipates the absorbed heat, and piping 136 that guides the heat absorbing medium flowing through the first heat exchanger 132 and the second heat exchanger 134 to circulate into the nuclear reactor 122. In this case, the first heat exchanger 132 may be located in the nuclear reactor 122. In this case, the heat absorbing medium may be a material of various components, but may typically be water.

In this case, the first heat exchanger 132 of the emergency cooling flow passage 130 may be a steam generator of the reactor drive system 120 described above or may be a separate component from the steam generator. That is, in the case where the first heat exchanger 132 is a steam generator of the reactor drive system 120, the piping 136 of the emergency cooling flow passage 130 may be configured to be branched or merged at a certain point of the flow passage piping of the reactor drive system 120.

In addition, the energy release space 110 and the energy absorbing space 210 may communicate with each other so that pressure is transferred. To this end, a pressure equalization pipe 218 may be provided which delivers the pressure of the energy release space 110 to the energy absorbing space 210. In this case, the pressure equalization pipe 218 may be configured to communicate the reactor thermal insulation vessel with the energy absorbing space 210 such that the water vapor pressure in the reactor thermal insulation vessel 126 is transferred to the energy storing space 210 via the pressure equalization pipe 218.

Accordingly, when the pressure in the energy release space 110 is raised, an elevated pressure may be transferred to the energy absorbing space 210 by the pressure equalization pipe 218. That is, when the nuclear reactor 122 is overheated to increase the water vapor pressure in the reactor thermal insulation vessel 126, the increased pressure may be transferred to the energy absorbing space 210 by the pressure equalization pipe 218 to pressurize the cooling water contained in the energy absorbing space 210.

In addition, a coolant spray pipe 228 may be provided. The coolant spray pipe 228 may be provided to guide cooling water of the energy absorbing space 210 pressurized by the pressure equalization pipe 218 to the energy transfer space 220.

The coolant spray pipe 228 may extend from the lower side of the energy absorbing space 210 to the upper side of the energy transfer space 220 to guide the cooling water in the energy absorbing space 210 to the energy transfer space 220.

Meanwhile, the energy transfer space 220 may include a saturated vapor pressure cooling chamber 222 and a reference pressure chamber 224.

The saturated vapor pressure cooling chamber 222 may contain cooling water therein. In addition, the second heat exchanger 134 of the emergency cooling flow passage 130 may be located therein, and a spray-side end of the coolant spray pipe (228) may be configured to spray cooling water to the second light exchanger 134.

In addition, the reference pressure chamber 224 is provided below the saturated vapor pressure cooling chamber 222, and communicates with the lower side of the saturated vapor pressure cooling chamber 222 at the lower side of the reference pressure chamber 224, gas is filled so as to be pressure-balanced with the cooling water in the saturated vapor pressure cooling chamber 222, and airtightness can be achieved so that internal air does not leak to the outside. That is, the pressure of the gas inside the reference pressure chamber 224 supports the cooling water in the saturated vapor pressure cooling chamber 222.

Accordingly, the water level may be changed depending on the pressure in the saturated vapor pressure cooling chamber 222, such as the cooling water flows into the reference pressure chamber 224 when the pressure of the saturated vapor cooling chamber 222 is increased, and the cooling water in the reference pressure chamber 224 is pushed out to the saturated vapor pressure cooling chamber 222 when the pressures of the saturated vapor pressure cooling chamber 222 is decreased.

In this case, the reference pressure chamber 224 may be formed to be spaced apart by a predetermined distance from the inner surface of the saturated vapor pressure cooling chamber 222 of the energy transfer space 220, and the lower side may be formed to be opened to communicate with the saturated vapor pressure cooling chamber.

Therefore, the saturated vapor pressure cooling chamber 222 in contact with the energy release space 110 is always maintained in a state of being filled with cooling water, so that it can effectively absorb heat transferred as heat conduction from the energy release space 110.

Meanwhile, the saturated vapor pressure cooling chamber 222 may be formed as high as possible so that a cavity due to atmospheric pressure may not be generated at the upper end thereof when the cooling water is full therein. Therefore, when the temperature of the cooling water of the saturated vapor pressure cooling chamber 222 is increased, it can be more easily vaporized at the upper end thereof.

In addition, the second heat exchanger 134 of the emergency cooling flow passage 130 may be provided adjacent to the upper end of the saturated vapor pressure cooling chamber 222. Accordingly, the cooling water of the saturated vapor pressure cooling chamber 222 heated by the second heat exchanger 134 of the emergency cooling flow passage 130 can be easily vaporized at the upper end of the saturated vapor pressure cooling chamber 222.

The heat transferred by the emergency cooling flow passage 130 may be dissipated through conduction to the outside through the outer walls of the energy absorbing space 210 and the energy transfer space 220. That is, the cooling water may be cooled in such a way that heat is dissipated through conduction to seawater, fresh water, or the atmosphere in contact with the energy absorbing space 210 and the energy transfer space 220.

Figure 4:
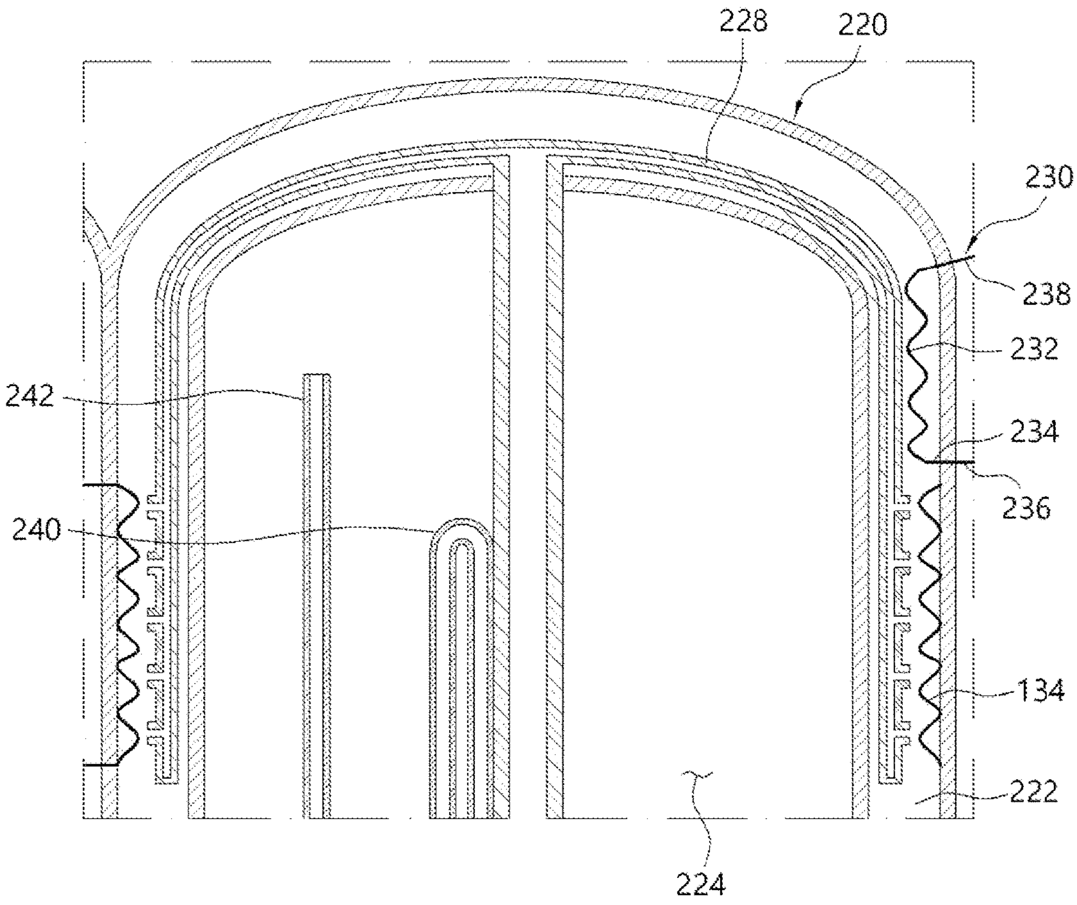
FIG. 4 shows an example in which the saturated vapor pressure cooling chamber of FIG. 2 is provided with a heat discharge flow path.

Alternatively, as shown in FIG. 4, a heat discharge flow passage 230 may be provided for discharging the heat of the cooling water heated by the emergency cooling flow passage 130 to the outside to cool it.

The heat discharge flow passage 230 is provided in the energy transfer space 220, and may discharge heat in the energy transfer space 220 to external seawater, river water, or the atmosphere.

The heat discharge flow passage 230 may include a third heat exchanger 232 that re-absorbs the heat absorbed by the cooling water sprayed from the coolant spray pipe 228 to the second heat exchanger 134, and a refrigerant pipe 234 that guides the external refrigerant to the third heat exchanger 232 and absorbs the heat in the third heat exchanger 232 to discharge the heated refrigerant to outside.

The second heat exchanger 134, the coolant spray pipe 228 and the third heat exchanger 232 may be provided in the saturated vapor pressure cooling chamber 222.

Figure 5:
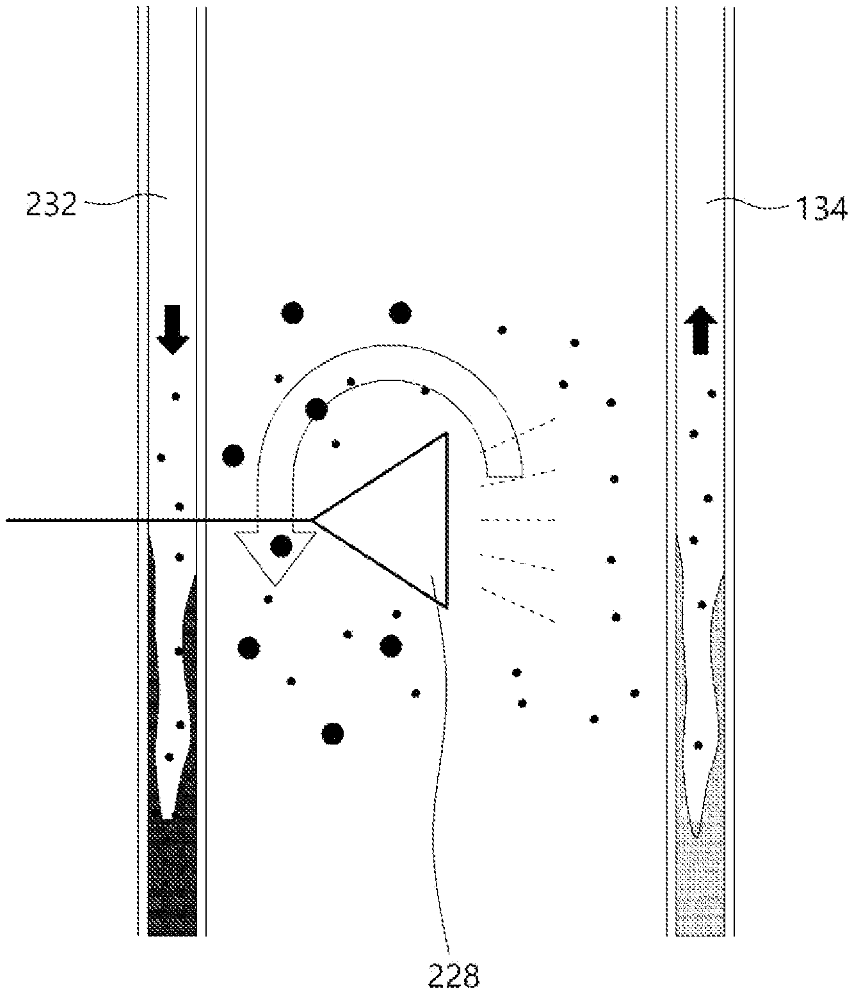
FIG. 5 is a view showing a state in which the cooling water sprayed from the coolant spray pipe by the two-phase heat transfer mechanism is evaporated in the second heat exchanger and then condensed in the third heat exchanger.

As described above, the saturated vapor pressure cooling chamber 222 is normally filled with cooling water therein, but when the temperature of the cooling water rises, as shown in FIG. 4 and FIG. 5, it is vaporized from the upper end of the saturated vapor cooling chamber 222, and a cavity is formed, so that the second heat exchanger 134, the coolant spray pipe 228, and the third heat exchanger 232 can be exposed to the cavity. At this time, the cavity around the second heat exchanger 134, the coolant spray pipe 228 and the third heat exchanger 232 may be in a saturated vapor pressure state.

In this case, as shown in FIG. 5, when cooling water is sprayed dropwise to the second heat exchanger 134 from the coolant spray pipe 228, the sprayed cooling water absorbs heat in the second heat exchanger 134 and evaporates into water vapor. This water vapor may be cooled by being taken heat away in the adjacent third heat exchanger 232, and condensed back into water.

Thus, the heat is absorbed or released through the heat of vaporization in which water is vaporized and the heat of condensation in which vaporized water vapor is condensed into water. This heat transfer phenomenon by vaporization and condensation of cooling water is called a two-phase heat transfer mechanism.

Such a two-phase heat transfer method is evaluated to be about 20 times or more superior in heat transfer rate compared to the above-described pool-boiling method.

Of course, instead of such a two-phase heat transfer mechanism, it will be possible that after the cooling water absorbs the heat of the second heat exchanger (134), the third heat exchanger (232) may absorb and discharge the heat.

Both ends of the refrigerant pipe 234 of the heat discharge flow passage 230, i.e., the inlet end 236 and the outlet end 238 of water can communicate with seawater, fresh water or atmosphere outside the energy transfer space 220.

In addition, a siphon cooling water recirculation pipe 240 may be provided.

The siphon cooling water recirculation pipe 240 may have a suction end located in the reference pressure chamber 224 and a discharge end located within the reactor thermal insulation vessel 126 so as to allow the cooling water of the reference pressure chamber 224 to flow into the reactor thermal insulation vessel 126 of the energy release space 110. In this case, the discharge end may be formed to be located at the lower side of the reactor thermal insulation vessel 126 at a position lower than the inlet end.

In this case, the suction end of the upper side of the siphon cooling water recirculation pipe 240 may be formed in an inverted U-shape in which the suction end is opened downward, extends upward from the suction end, and then is bent and extended downward. In addition, the suction end of the siphon cooling water recirculation pipe 240 may be located at the lower side of the reference pressure chamber 224 to always suck the cooling water.

Figure 6:
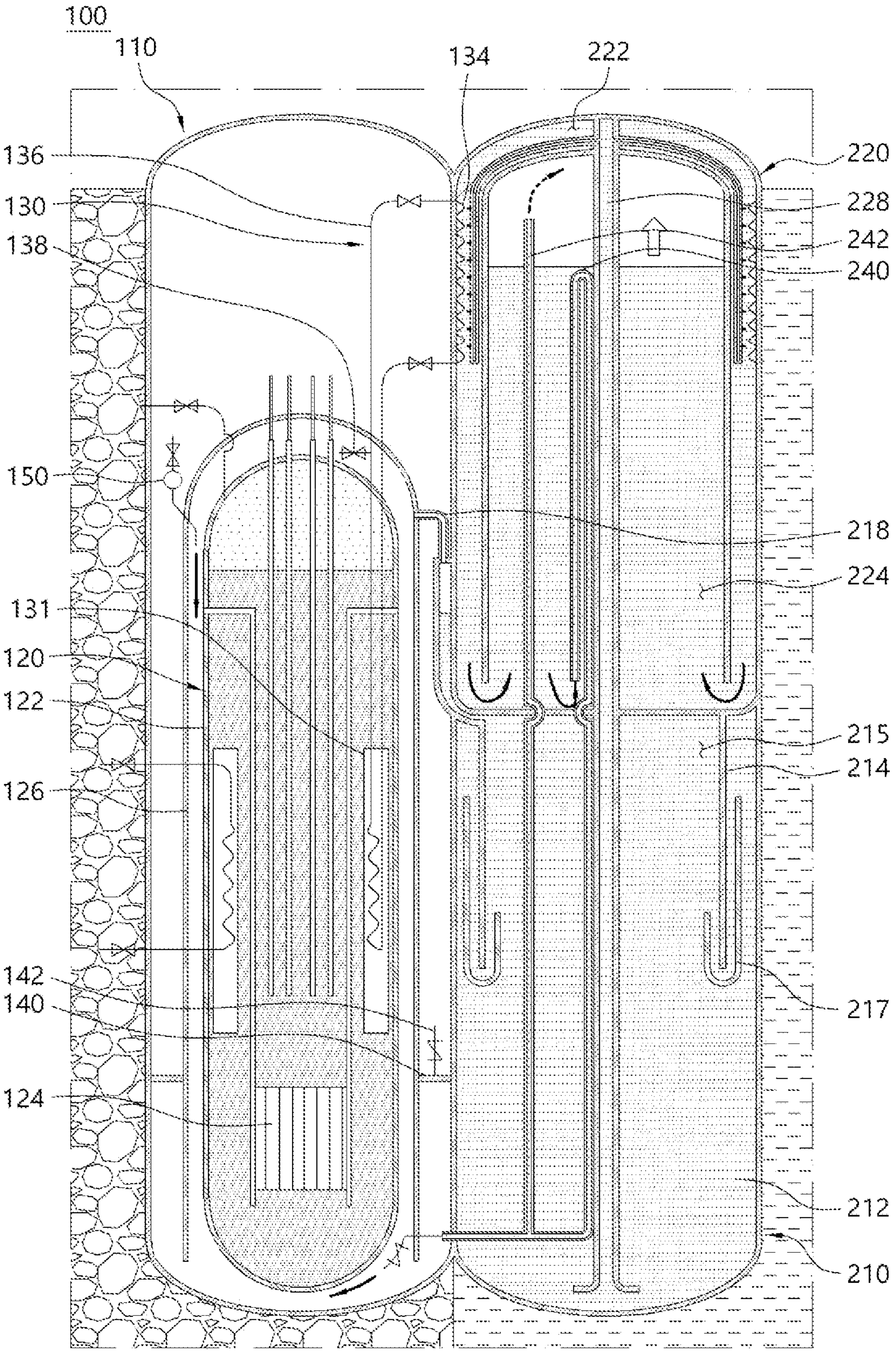
FIG. 6 is a view showing a state in which water vapor of the reactor thermal insulation vessel enters the energy absorbing space in the passive cooling system for the nuclear reactor of FIG. 2.
Figure 13:
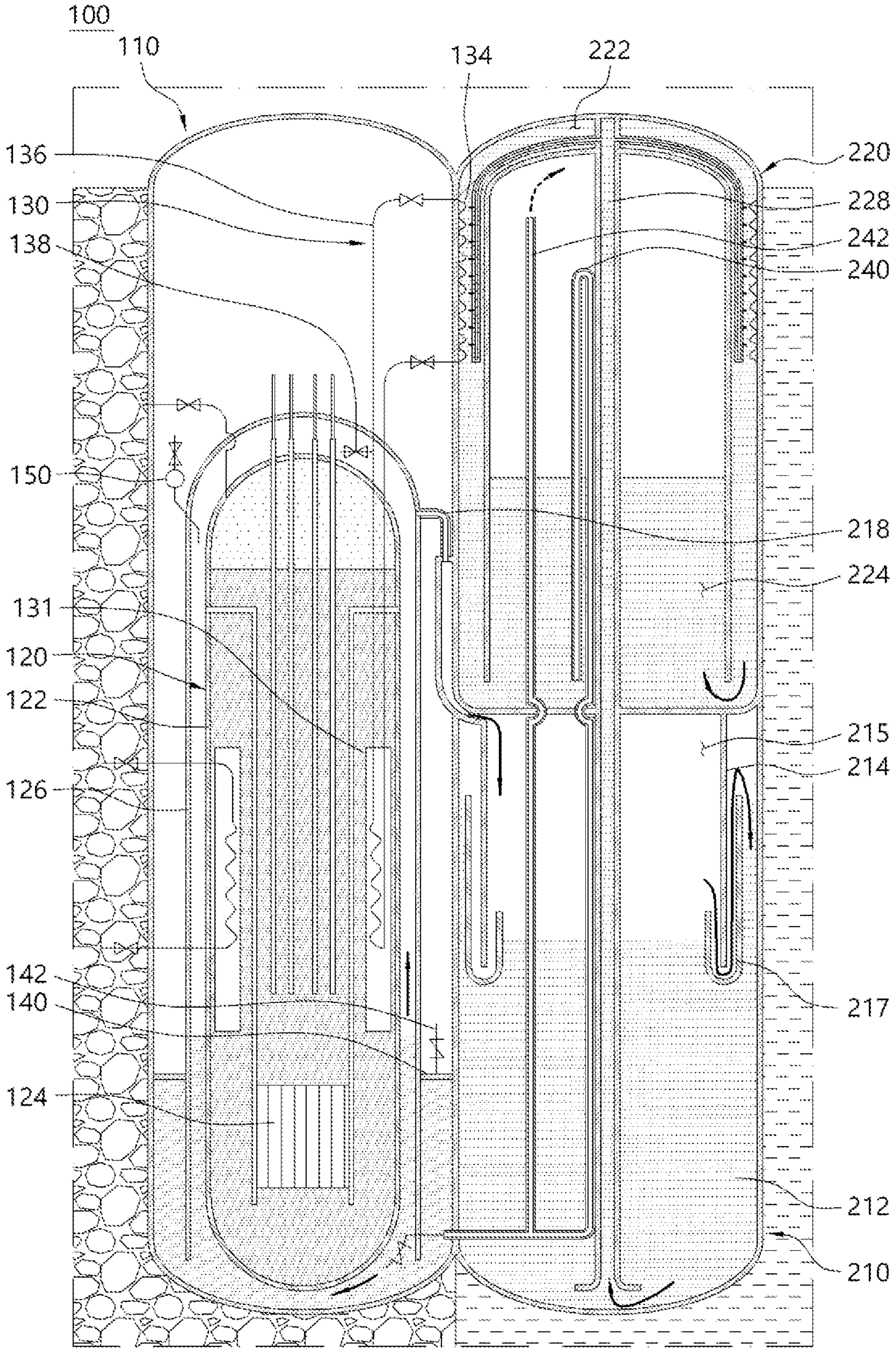
FIG. 13 is a view showing a state in which the cooling water in the reference pressure chamber is circulated to the reactor thermal insulation vessel side through the siphon cooling water recirculation pipe in the passive cooling system for the nuclear reactor of FIG. 5.

Thus, as shown in FIGS. 6 and 13, when the water level in the reference pressure chamber 224 rises above the bent point of the siphon cooling water recirculation pipe 240, the cooling water in the reference pressure chamber 224 can be supplied into the reactor thermal insulation vessel 126 by the siphon cooling water recirculation pipe 240.

Further, a siphon air discharge pipe 242 for discharging the air flowing into the siphon cooling water recirculation pipe 240 to the reference pressure chamber 224 side extends upward from the vicinity of the discharge end of the siphon coolant recirculation pipe 240 to the reference pressure chamber 224 side. At this time, the uppermost end of the siphon air discharge pipe 242 may be provided to extend to a position higher than the bent uppermost end of the siphon cooling water recirculation pipe 240 so that cooling water does not flow into the siphon air discharge pipe 242.

Therefore, gas such as air bubbles contained in the cooling water flowing into the siphon cooling water recirculation pipe 240 can be discharged to the reference pressure chamber 224 side through the siphon air discharge pipe 242, and whereby only the liquid cooling water can be supplied into the reactor thermal insulation vessel 126.

In addition, the cooling water supplied into the reactor thermal insulation vessel 126 by the siphon cooling water recirculation pipe 240 is vaporized while cooling the heat of the nuclear reactor 122, and the pressure thereof is increased so as to be able to flow into the energy absorbing space 210 through the pressure equalization pipe 218 in the form of water vapor.

Further, the water vapor flowing into the energy absorbing space 210 may be condensed while being cooled in the energy absorbing space 210, and may be liquefied into a liquid phase again.

Accordingly, it is possible to control the circulation of the cooling water even if a separate valve is not provided.

Figure 7:
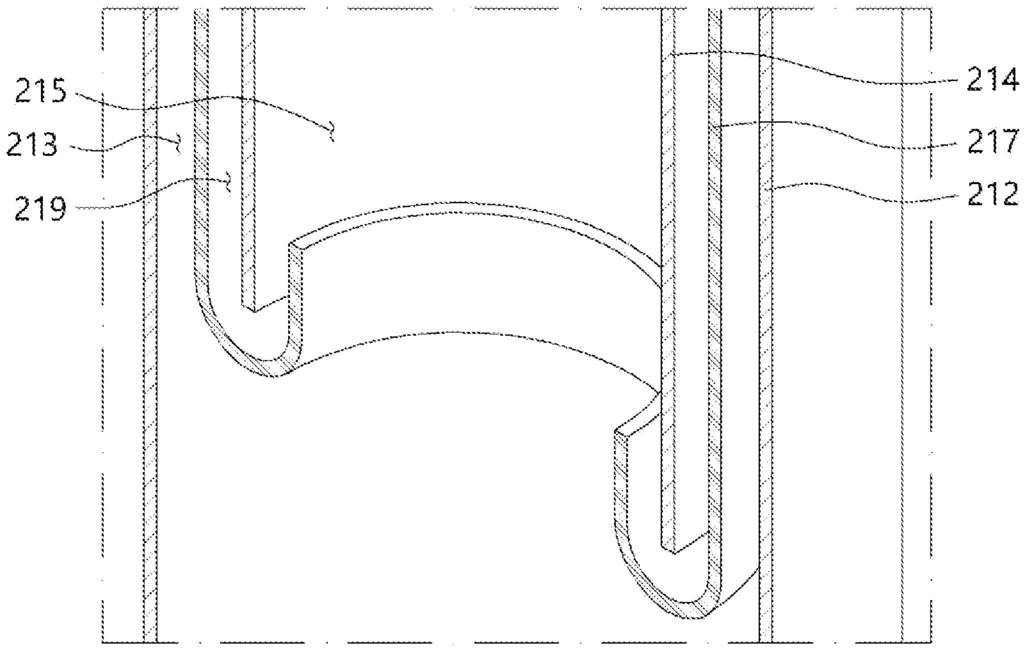
FIG. 7 is a view showing a cooling water storage tank and a lower cylinder and a vapor induction path securing pipe body of the passive cooling system for the nuclear reactor of FIG. 2.

Meanwhile, the energy absorbing space 210 may include a cooling water storage tank 212 and a lower cylinder 214 as shown in FIGS. 2 and 7.

The cooling water storage tank 212 may be positioned below the reference pressure chamber 224 of the energy transfer space 220, be in contact with the energy release space 110, and be provided to store cooling water.

Further, the lower cylinder 214 may form a pressurization space 215 formed on the upper side of the cooling water storage tank 212 and in which the water vapor delivered from the reactor thermal insulation vessel 126 through the pressure equalization pipe 218 pressurizes the cooling water.

Further, the lower cylinder 214 may extend a predetermined distance from the upper side to the lower side of the energy absorbing space 210 at a position spaced inward from the side wall of the cooling water storage tank 212 by a predetermined distance, and the lower side may be opened to communicate with the cooling water storage tank 212.

Further, the pressure equalization pipe 218 may communicate with an upper portion of the pressurization space 215 in the lower cylinder 214.

Accordingly, the lower cylinder 214 may form a pressurization space 215 in which pressure is applied such that the pressure of the water vapor transferred through the pressure equalization pipe 218 causes the cooling water in the cooling water storage tank 212 to flow through the coolant spray pipe 228 to the energy transfer space 220.

That is, the cooling water of the cooling water storage tank 212 is pressurized according to the pressure of the pressurization space 215, and the cooling water may be raised to the energy transfer space 220 through the coolant spray pipe 228 by the force of the pressure of the pressurization space 215 pressing the cooling water.

In addition, the energy absorbing space 210 may further include a vapor induction path securing pipe body 217. The vapor induction path securing pipe body 217 is a component for securing a vapor flow path 219 through which water vapor in the pressurization space 215 moves between the lower cylinder 214 and the inner surface of the cooling water storage tank 212.

The vapor induction path securing pipe body 217 may be formed to extend downward more than the lower end of the lower cylinder 214 in a state of being spaced apart by a predetermined distance from the outer circumference surface of the lower cylinder 214 at the outside of the lower cylinder 214, and to extend upward while being spaced apart by a predetermined distance from the inner circumference surface of the lower cylinder 214 after being bent from the lower side of the lower cylinder 214 toward the inside of the lower cylinder 214.

That is, the vapor flow path 219 is secured through which the water vapor in the pressurization space 215 between the lower cylinder 214 and the vapor induction path securing pipe body 217 moves between the outer circumference surface of the lower cylinder 214 and the inner surface of the cooling water storage tank 212.

In addition, a condensation space 213 in which water vapor flowing in is condensed into a liquid phase may be formed between the outer circumference surface of the vapor induction path securing pipe body 217 and the inner circumference surface of the cooling water storage tank 212 or between the outer circumference surface of the lower cylinder 214 and the inner circumference surface of the cooling water storage tank 212.

That is, the pressurization space 215 is spaced apart from the inner surface of the cooling water storage tank 212 by the lower cylinder 214. The wall surface of the cooling water storage tank 212 is in contact with the outside and thus may be relatively low in temperature, and since the water vapor introduced through the pressure equalization pipe 218 is not in direct contact with the wall surface of the cooling water storage tank 212, the condensation phenomenon of water vapor in the pressurization space 215 may be minimized and the volume and pressure may be maintained.

Figure 8:
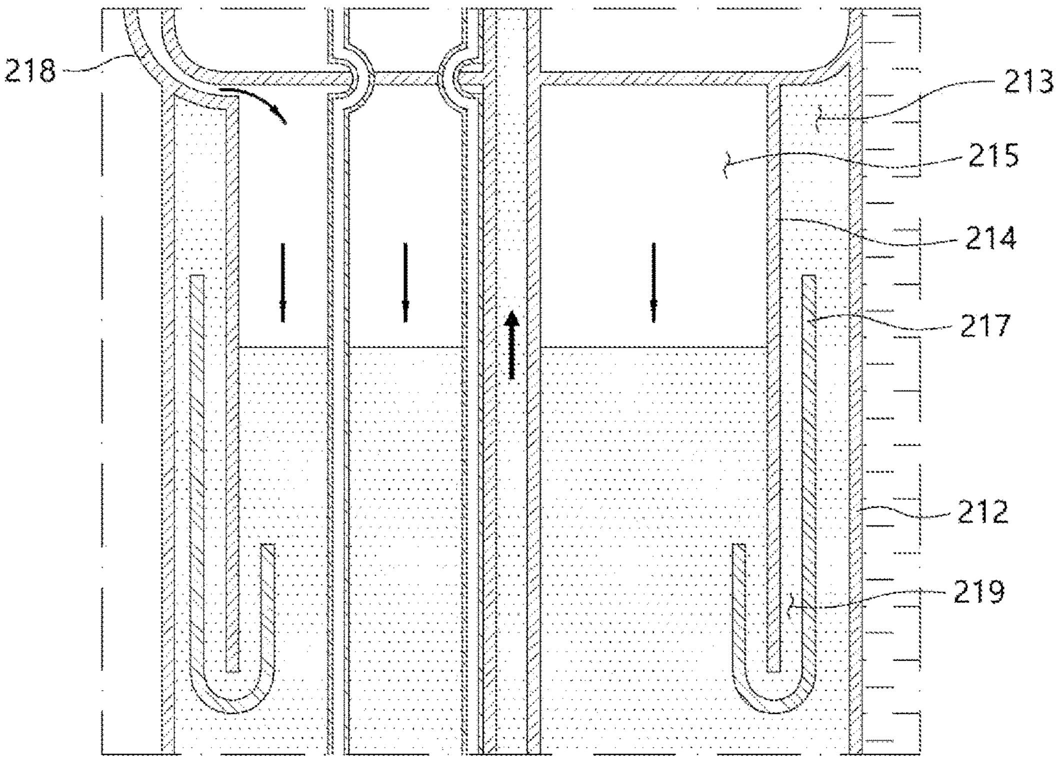
FIGS. 8 to 10 are views sequentially showing that the cooling water in the pressurization space is lowered by the pressure of water vapor introduced through the pressure equalization pipe, and the water vapor is discharged from the pressurization space to the condensation space through the vapor flow path and condensed.
Figure 9:
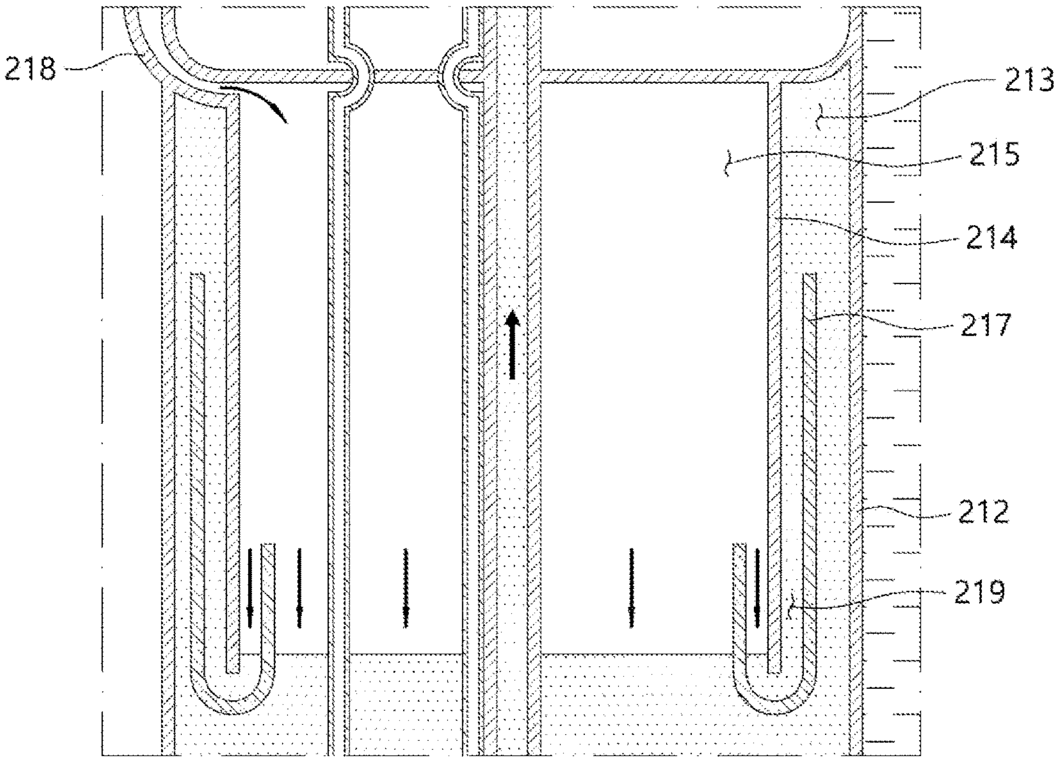
Figure 10:
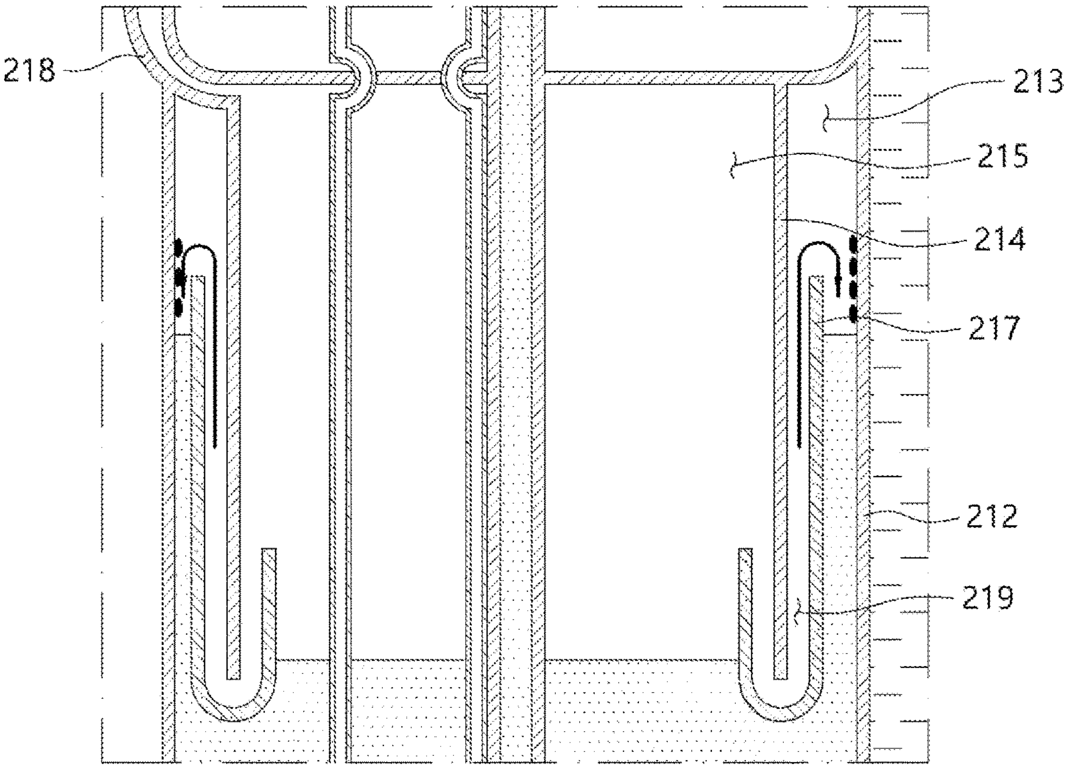

The vapor flow path 219 may transfer water vapor in the pressurization space 215 between the lower cylinder 214 and the cooling water storage tank 212, as shown in FIGS. 2 and 7, and as shown in FIGS. 8 to 10, the water vapor transferred between the lower cylinder 214 and the cooling water storage tank 212 may push down the cooling water in the pressurization space 215 between the lower cylinder 214 and the cooling water storage tank 212 while pressurizing the cooling water.

As shown in FIG. 8, as the pressurization space 215 is filled with water vapor, the water level in the pressurization space 215 drops due to the pressure thereof. At this time, the water level of the cooling water in the pressurization space 215 may drop through the upper end portion of the vapor induction path securing pipe body 217 in the upper cylinder 214 toward the lower end of the lower cylinder 214, and the water level in the vapor flow path 219 may also drop to the same level as the water level in the lower cylinder 214.

In addition, as shown in FIG. 9, when the cooling water level in the pressurization space 215 drops further than the lower side of the lower cylinder 214, as shown in FIG. 10, the water vapor in the pressurization space 215 is moved to the condensation space 213 between the outer circumference surface of the lower cylinder 214 and the inner surface of the cooling water storage tank 212 through the vapor flow path 219, and the vapor flow path 219 may be secured by the pressure of the water vapor.

In addition, since some water vapor in the pressurization space 215 is moved to the condensation space, the water level in the pressurization space 215 is increased, and at this time, the vapor flow path 219 may maintain a secured state until the level of the cooling water in the pressurization space 215 does not rise higher than the upper end of the vapor induction path securing pipe body 217 inside the lower cylinder 214, and the water vapor introduced into the pressurization space 215 may be supplied to the condensation space 213 through the vapor flow path 219.

The water vapor supplied to the condensation space 213 may pressurize the cooling water in the condensation space 213 so that the water level of the cooling water in the condensation space 213 decreases.

In addition, the water vapor supplied to the condensation space 213 may be condensed on the wall surface of the cooling water storage tank 212 which is a relatively low temperature in the condensation space 213, reduced to a liquid state, and reduced to cooling water.

In addition, a cross-sectional area between the cooling water storage tank 212 and the lower cylinder 214 may be formed to be smaller than a cross-sectional area within the lower cylinder 214. Therefore, before the water vapor in the pressurization space 215 acts to lower the water level of the cooling water in the lower cylinder 214, the water vapor may first flow into between the lower cylinder 214 and the cooling water storage tank 212 to pressurize downward the cooling water between the coolant storage tank 212 and the low cylinder 214.

Thus, cooling water always exists between the lower cylinder 214 and the cooling water storage tank 212 so that the heat of the energy release space 110 can be more easily transferred and cooled.

Meanwhile, a blocking wall 140 may be formed to partition between the reactor thermal insulation vessel 126 and the inner surface of the energy release space 110.

The blocking wall 140 may be installed above the discharge end of the siphon cooling water recirculation pipe 240 as shown in FIG. 13, and may partition between the reactor thermal insulation vessel 126 and the inner surface of the energy release space 110 to block the cooling water supplied to the lower side of the nuclear reactor thermal insulation vessel 126 through the siphon cooling water recirculation pipe 240 from rising to the upper side of the blocking wall 140.

In addition, the blocking wall 140 may be provided with an air release valve 142. The air release valve 142 may selectively release non-condensed gas inside the space surrounded by the reactor thermal insulation vessel 126 and the blocking wall 140 toward the energy release space 110. Here, the non-condensed gas may refer to dry air that contains substantially no or less moisture.

That is, the reactor thermal insulation vessel 126 and the energy release space 110 are normally filled with air, but such air does not contain moisture or contains less moisture, so that even if it flows into the energy absorbing space 210 and energy transfer space 220, the cooling effect is poor, thus the air pushed by the filling of the cooling water starting from the lower side of the reactor thermal insulation vessel 126 through the siphon cooling water recirculation pipe 240 may be discharged toward the energy release space 110.

Meanwhile, as described above, when the nuclear reactor 122 is operating normally, all of the heat generated in the reactor core 124 is used to generate power through the reactor drive system 120. In this case, the nuclear reactor safety system such as the energy absorbing space 210 and the energy transfer space 220 is not operated, and as shown in FIG. 2, both the energy absorbing space 210 and the saturated vapor pressure cooling chamber 222 are maintained in a state of being fully filled with cooling water, and the reactor thermal insulation vessel 126 and the energy release space 110 are normally filled with air.

In addition, when the nuclear reactor is in an abnormally overheated state due to various causes during operation of the nuclear reactor, the nuclear reactor safety system may be operated.

As described above, when the nuclear reactor safety system starts to operate, water vapor should flow into the energy absorbing space 210 through the pressure equalization pipe 218, but in a state in which the nuclear reactor 122 is normally operated, the reactor thermal insulation vessel 126 and the energy release space 110 are filled with dry air, not water vapor, so that the water vapor pressure may be insufficient during initial operation.

Accordingly, a starting cooling water supply unit 150 for supplying water vapor capable of starting the nuclear reactor safety system when it starts to operate may be provided.

As shown in FIG. 2, the starting cooling water supply unit 150 may be disposed on the upper side of the reactor thermal insulation vessel 126, and be configured to supply a predetermined amount of cooling water into the reactor thermal insulation vessel 126 when the temperature and the pressure of the reactor thermal insulation vessel 126 in the energy release space 110 are increased by a certain amount to reach the condition that the nuclear reactor safety system is operated.

Figure 11:
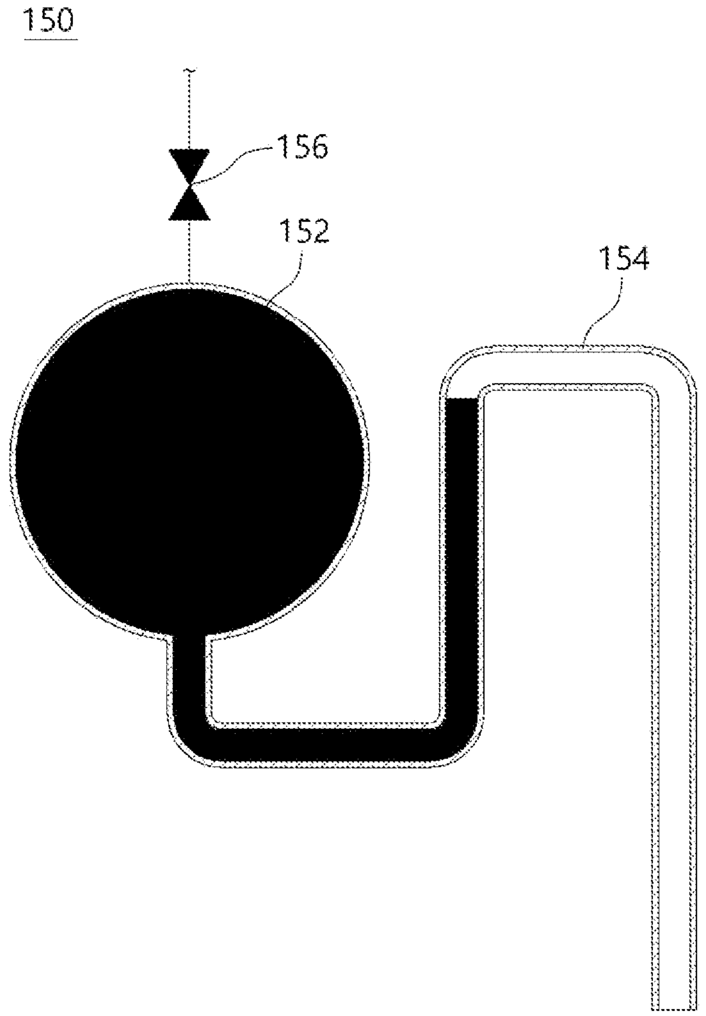
FIG. 11 is a view showing a state when the starting cooling water supply unit of FIG. 2 is before operation.

The starting cooling water supply unit 150 may include a water tank 152 in which a predetermined amount of cooling water is stored, a siphon path 154 and a starting valve 156, as shown in FIGS. 10 and 11. In this embodiment, the water tank 152 is described as an example of a spherical shape as shown, but the shape of the water tank 152 is not limited thereto.

The siphon path 154 may be configured to have an inlet end at which the cooling water of the water tank 152 is introduced, located at the lower side, to extend upward from the inlet end and then be bent and extended downward, and to have a discharge end from which the cooling water is discharged, inside the reactor thermal insulation vessel 126.

In this case, the bent upper side of the siphon path 154 may be formed at a position lower than the maximum level of the water tank.

In addition, the starting valve 156 may close the water tank 152 or open to communicate with the tank 152 and the energy release space 110 so that the air in the energy release space 110 is supplied into the water tank 152.

In this case, the condition that the starting valve 156 is opened may correspond to a condition that a temperature and a pressure of the energy release space 110 or the reactor thermal insulation vessel 126 operate the nuclear reactor safety system.

Thus, as shown in FIG. 5, cooling water is supplied into the reactor thermal insulation vessel 126, the supplied cooling water is vaporized by the heat of the nuclear reactor 122 to become a water vapor form and the pressure rises, and the water vapor flows through the pressure equalization pipe 218 to the energy absorbing space 210, whereby the nuclear reactor safety system may start to operate.

Alternatively, a vapor release valve 138 provided in the emergency cooling flow passage 130 may be used to form the water vapor pressure during the initial operation.

The refrigerant in the emergency cooling flow passage 130 may also be water, and the high temperature part of the pipe 136 through which the heated refrigerant of the emergency cooling flow passage 130 flows is in a state of being heated by the nuclear reactor 122. In this case, when the vapor release valve 138 of the emergency cooling flow passage 130 is opened, the refrigerant in the emergency cooling flow passage 130 may be discharged in the form of water vapor into the reactor thermal insulation vessel 126 to form a water vapor pressure in the nuclear reactor thermal insulation vessel 126.

To this end, the vapor release valve 138 may be located in a portion of the pipe 136 of the emergency cooling flow passage 130 through which the high-temperature refrigerant flows, and may be located inside the reactor thermal insulation vessel 126.

Hereinafter, another embodiment of a passive cooling system 1000 for a nuclear reactor of the present invention will be described.

Figure 14:
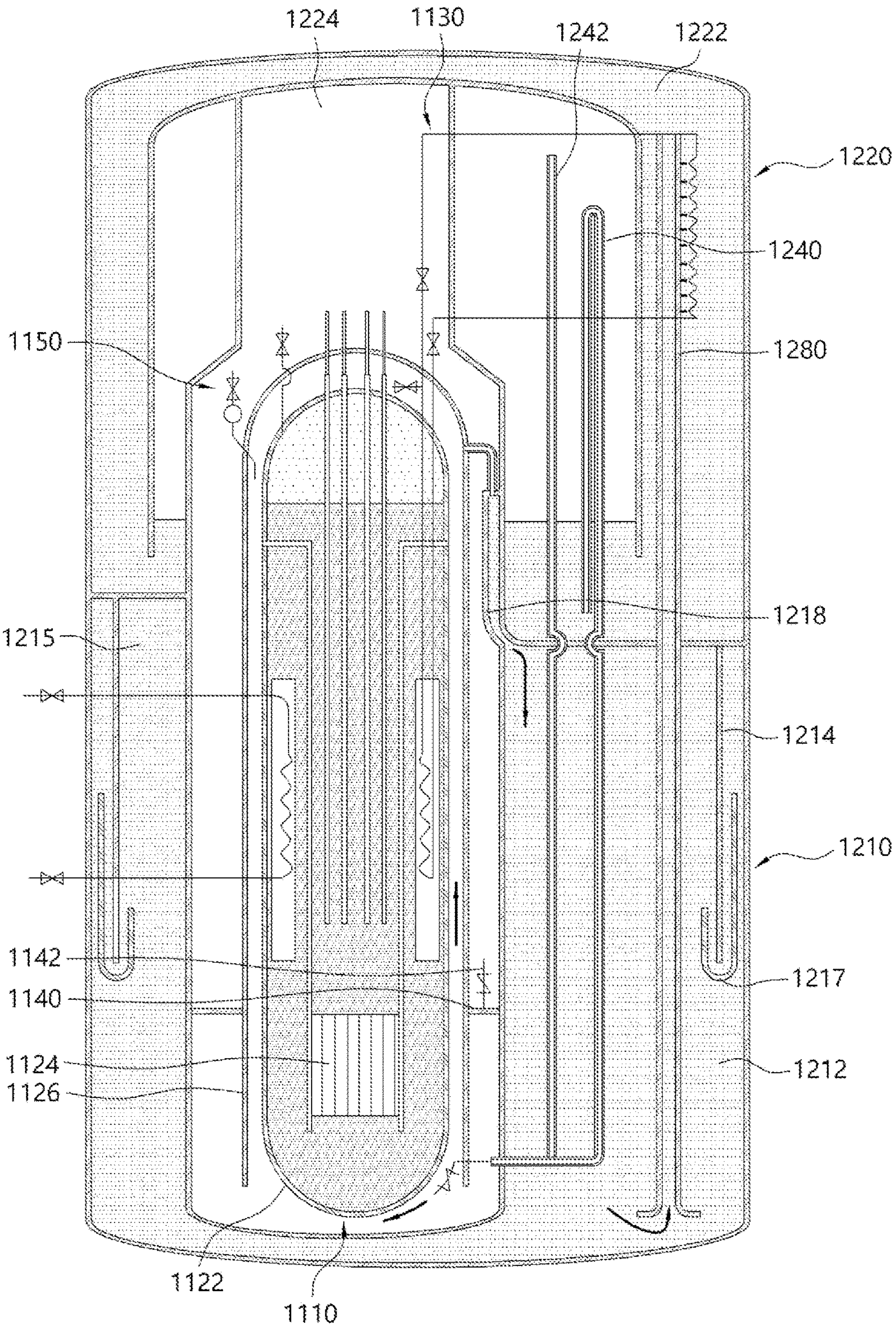
FIG. 14 shows a passive cooling system for a nuclear reactor according to another embodiment of the present invention.

As shown in FIG. 13, for the passive cooling system 100 for the nuclear reactor of the above-described embodiment, the energy absorbing space 210 and the energy transfer space 220 may be positioned side by side connected to one side of the energy release space 110, but as shown in FIG. 14, for the passive cooling system 1000 for the nuclear reactor according to the present embodiment, the energy release space 1110 may be located in the energy absorbing space 1210 and the energy transfer space 1220.

That is, the energy absorbing space 1210 and the energy transfer space 1220 are formed to surround the outer circumference of the energy release space 1110, and the energy release space 1110 is located inside the energy absorbing space 1210 and the energy release space 1110.

That is, the energy transfer space 1220 may include a saturated vapor pressure cooling chamber 1222 and a reference pressure chamber 1224, similar to the embodiment described above.

In saturated vapor pressure cooling chamber 1222, the second heat exchanger of the emergency cooling flow passage 1130 and the cooling water discharge end of the coolant spray pipe 1228 are located, so that the cooling water flowing from the cooling water discharge end may be filled.

Further, the reference pressure chamber may be formed to be spaced inward from an inner surface of the saturated vapor pressure cooling chamber 1222, and a lower side thereof may be opened so that it communicates with the saturated vapor pressure cooling chamber 1222 and air is filled to achieve a pressure balance with cooling water in the saturated vapor pressure cooling chamber 1222, so that the water level changes according to the pressure in the saturated vapor pressure cooling chamber 1222.

In this case, an upper portion of the energy release space 1110 may be disposed to be located inside the reference pressure chamber 1224.

In addition, the energy absorbing space 1210 may include a cooling water storage tank 1212 and a lower cylinder 1214, similar to the above-described embodiment, the cooling water storage tank 1212 being formed below the reference pressure chamber 1224 to be partitioned from the reference pressure chamber 1224, and cooling water may be stored therein.

In addition, the lower cylinder 1214 may be formed on the upper side of the cooling water storage tank 1212, form a space in which water vapor of the nuclear reactor thermal insulation vessel 1126 delivered through the pressure equalization pipe 1218 is condensed, and extend a certain distance from the upper side toward the lower side of the energy absorbing space 1210 at a position spaced inward by a predetermined distance from a side wall of the cooling water storage tank 1212 to form a pressurization space 1215 that applies pressure so that cooling water in the cooling water storage tank 1212 flows through the coolant spray pipe 1228 to the energy transfer space 1220 by the pressure of the water vapor, and the lower side thereof may be opened to communicate with the cooling water storage tank 1212.

And, the remaining portion of the energy release space 1110 excluding the portion located in the reference pressure chamber 1224 may be located partitioned in the lower cylinder 1214, inner side of the lower cylinder 1214, and the cooling water storage tank 1212.

That is, the energy release space 1110 is positioned across the energy transfer space 1220 and the energy absorbing space 1210, and the energy transfer space 1220 and the energy absorbing space 1210 are arranged to surround the outside of the energy release space 1110.

Therefore, since the energy release space 1110 is surrounded by the cooling water of the energy transfer space 1220 and the energy absorbing space 1210, the heat radiated from the nuclear reactor 1122 may be easily absorbed by the cooling water.

In addition, since the energy release space 1110 is surrounded by cooling water having an excellent radiation shielding efficiency, even if radiation leaks from the nuclear reactor 1122 it can be effectively shielded by the cooling water.

Meanwhile, the emergency cooling flow passage 1130, the reactor thermal insulation vessel 1126, the pressure equalization pipe 1218, the coolant spray pipe 1228, the siphon cooling water recirculation pipe 1240, the vapor induction path securing pipe body 1217, the siphon air discharge pipe 1242, the blocking wall 1140, the air release valve 1142, the starting cooling water supply unit 1150 and the like that transmit the heat of the nuclear reactor 1122 to the energy transfer space 1220 are the same as those in the above-described embodiments.

That is, when the nuclear reactor 1122 of the energy release space 1110 is overheated and the heat and pressure in the nuclear reactor thermal insulation vessel 1126 are increased, water vapor is generated by the heat, and the water vapor pressure thereof is transferred to the energy absorbing space 1210 through the pressure equalization pipe 1218 to increase the pressure of the pressurization space 1215 in the energy absorbing space 1210, and is supplied to the saturated vapor pressure cooling chamber 1222 through the coolant spray pipe 1228 by the increased pressure.

Meanwhile, the heat of the nuclear reactor 1122 is transferred to the energy transfer space 1220 through the emergency cooling flow passage 1130 and is cooled by the cooling water in the energy transfer space 1220.

In addition, the water level in the reference pressure chamber 1224 is raised by the cooling water supplied to the saturated vapor pressure cooling chamber 1222 through the coolant spray pipe 1228, and when the water level of the cooling water in the reference pressure chamber 1224 is higher than the siphon cooling water recirculation pipe 1240, the cooling water is injected into the nuclear reactor thermal insulation vessel 1126 by the siphon cooling water recirculation pipe 1240.

In addition, the cooling water injected into the reactor 1122 thermal insulation vessel may be vaporized and expanded by the heat of the nuclear reactor 1122, and be subjected to phase change into water vapor, and the heat of the nuclear reactor 1122 may be cooled while the circulation in which the water vapor having an increased pressure is transferred to the energy absorbing space 1210 by the pressure equalization pipe 1218 continues.

Figure 15:
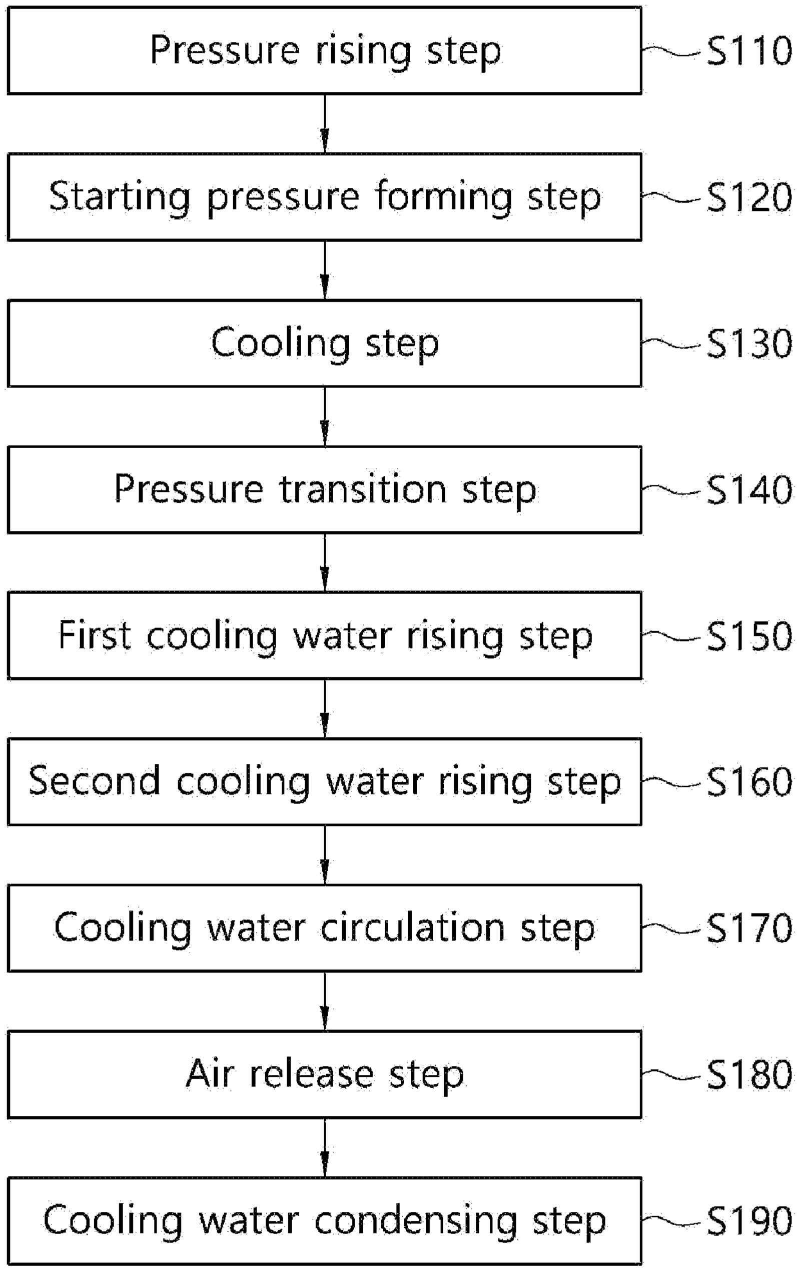
FIG. 15 is a flow chart illustrating a method of operating a passive cooling system for a nuclear reactor of the present invention.

Hereinafter, an embodiment of the method for operating the passive cooling system for the nuclear reactor described above will now be described with reference to FIG. 15.

The method for operating the passive cooling system for the nuclear reactor according to the present embodiment may include a pressure rising step S110, a cooling step S130, a pressure transition step S140, a first cooling water rising step S150, a second cooling water rising step S160, a cooling water circulation step S170, and a cooling water condensing step S190.

First, when the nuclear reactor is operating normally, all the heat generated in the reactor core 124 is used to generate power through the reactor drive system 120. In this case, the nuclear reactor safety system such as the energy absorbing space 210 and the energy transfer space 220 is not operated, and as shown in FIG. 2, both the energy absorbing space 210 and the saturated vapor pressure cooling chamber 222 may be maintained in a state of being fully filled with cooling water.

Meanwhile, when the nuclear reactor is in an abnormally overheated state due to various causes during operation of the nuclear reactor, the nuclear reactor safety system may be operated.

When the nuclear reactor safety system is activated, the reactor drive system 120 may be stopped, and all the heat generated in the nuclear reactor 122 may be discharged through the emergency cooling flow passage 130.

When the nuclear reactor is in an abnormally overheated state, a pressure rising step S110 may be entered. The pressure rising step S110 is a step in which the temperature and pressure in the reactor thermal insulation vessel 126 provided in the energy release space 110 is raised above a set value. In this case, the set value may be the temperature or pressure reached when the nuclear reactor is abnormally overheated.

Figure 12:
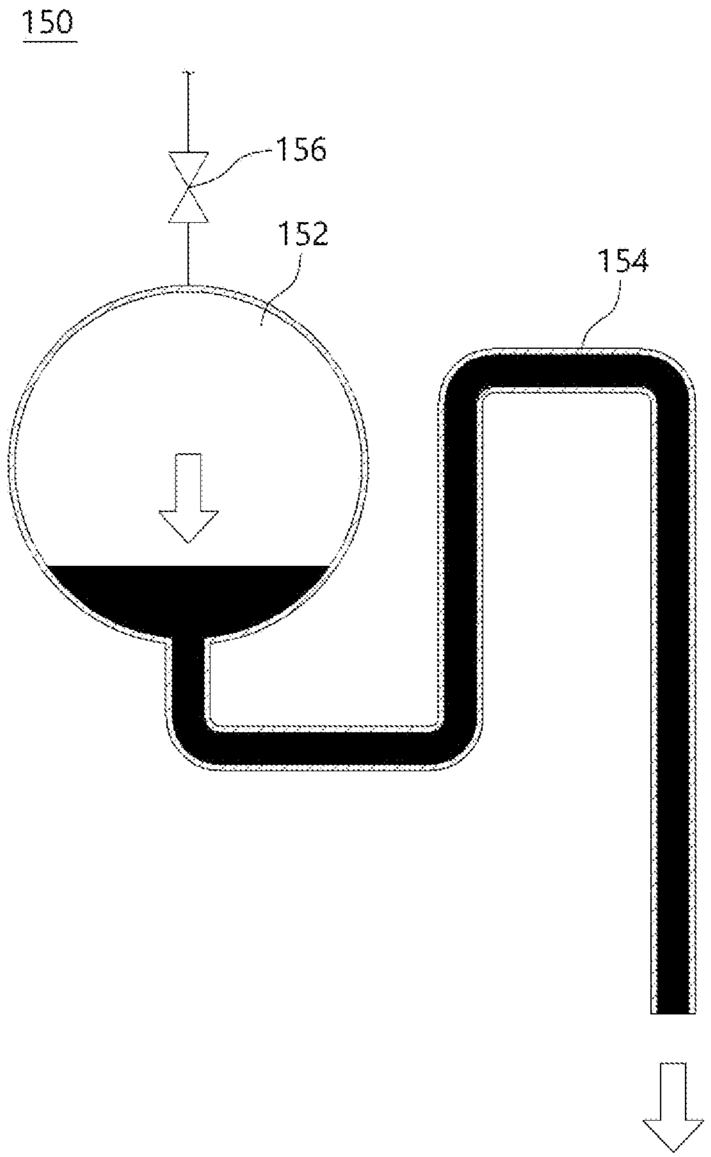
FIG. 12 is a view showing a state in which the starting cooling water supply unit of FIG. 11 supplies cooling water.

In the pressure rising step S110, a starting pressure forming step S120 may be performed when the pressure in the reactor thermal insulation vessel 126 is raised above the set value. As shown in FIGS. 10 and 12, the starting pressure forming step S120 is a step of forming a predetermined amount of water vapor pressure into the reactor thermal insulation vessel 126 when the temperature and pressure in the reactor thermal insulation vessel 126 are raised in the pressure rising step S110.

The starting pressure forming step S120 may be performed by opening the starting valve 156 of the starting cooling water supply unit 150 to inject cooling water stored in the water tank 152 of the starting cooling water supply unit 150 into the reactor thermal insulation vessel 126, as shown in FIG. 5.

The cooling water injected into the reactor thermal insulation vessel 126 may be vaporized and expanded by the heat of the nuclear reactor 122 to form an initial water vapor pressure.

Alternatively, the starting pressure forming step S120 may also form the initial water vapor pressure by opening the vapor release valve 138 of the emergency cooling flow passage 130 and injecting water vapor into the reactor thermal insulation vessel 126 through the vapor release valve 138 of the emergency cooling flow passage 130.

Meanwhile, the heat of the nuclear reactor 122 that has been abnormally overheated may be cooled by the cooling water of the energy transfer space 220 through the emergency cooling flow passage 130.

Then, the pressure transition step S140 may be performed. The pressure transition step S140 is a step in which water vapor having an elevated pressure and temperature in the reactor thermal insulation vessel 126 is transferred to the energy absorbing space 210 by the pressure equalization pipe 218, and as shown in FIGS. 8 to 10, the water vapor introduced into the pressurization space 215 in the lower cylinder 214 of the energy absorbing space 210 by the pressure equalization pipe 218 pressurizes cooling water in the energy absorbing space 210.

After the pressure transition step S140, a first cooling water rising step S150 may be performed. In the first cooling water rising step S150, as shown in FIG. 5, cooling water in the cooling water storage tank 212 of the energy absorbing space 210 is pressurized by the pressure of the water vapor delivered by the above pressure transition step S140, and the pressurized cooling water in the energy absorbing space 210 may be raised through the coolant spray pipe 228 to the saturated vapor pressure cooling chamber 222 in which the emergency cooling flow passage 130 is located.

The cooling water raised to the saturated vapor pressure cooling chamber 222 may absorb the heat of the second heat exchanger 134 of the emergency cooling flow passage 130.

After the first cooling water rising step S150, a second cooling water rising step S160 may be performed. The second cooling water rising step S160 is a step in which, when the amount of cooling water flowing into the saturated vapor pressure cooling chamber 222 in the first cooling water rising step S150 increases, the cooling water flows into the reference pressure chamber 224, and the water level inside the reference pressure chamber 224 is raised.

When the water level of the cooling water flowing into the reference pressure chamber 224 in the second cooling water rising step S160 becomes higher than the bent top end of the siphon cooling water recirculation pipe 240, as shown in FIGS. 6 and 13, a cooling water circulation step S170 may be performed, in which the cooling water is injected to the reactor thermal insulation vessel 126 by the siphon cooling water recirculation pipe 240.

When the water level of the cooling water that is raised in the reference pressure chamber 224 becomes higher than the bent top end of the siphon cooling water recirculation pipe 240, the siphon phenomenon causes cooling water inside the reference pressure chamber 224 to enter the lower side of the reactor thermal insulation vessel 126 along the siphon cooling water recirculation pipe 240.

At this time, an air release step S180 in which the air release valve 142 provided in the blocking wall 140 is opened may be performed, so that the air pushed by the filling of the cooling water starting from the lower side of the reactor thermal insulation vessel 126 through the siphon cooling water recirculation pipe 240 may be discharged to the energy release space 110.

In addition, as shown in FIG. 8, in the cooling water circulation step S170, cooling water injected to the reactor thermal insulation vessel 126 is vaporized and expanded by the heat of the nuclear reactor 122 to raise the water vapor pressure, and the pressurized water vapor is moved by the pressure equalization pipe 218 to the pressurization space 215 formed by the lower cylinder 214 of the energy absorbing space 210, and then a cooling water condensing step S190 may be performed, in which a part of the water vapor is condensed and liquefied by the surrounding cooling water in the pressurization space 215, and a part the water vapor pressurizes the cooling water in the pressurization space 215.

As described above, the water vapor introduced through the pressure equalization pipe 218 is partially liquefied and partially present in the gaseous state while pressurizing the cooling water in the pressurization space 215, and as the water vapor is introduced into the pressurization space 215 through the pressure equalization pipe 218, the water level within the pressurization space 215 may be lowered, as shown in FIG. 8.

In addition, as shown in FIGS. 9 and 10, when the cooling water level in the pressurization space 215 drops further than the lower side of the lower cylinder 214, the water vapor in the pressurization space 215 is moved to the condensation space 213 between the outer circumference surface of the lower cylinder 214 and the inner surface of the cooling water storage tank 212 through the vapor flow path 219, and the vapor flow path 219 may be secured by the pressure of the water vapor.

In addition, since some water vapor in the pressurization space 215 is moved to the condensation space, the water level in the pressurization space 215 is increased, and at this time, the vapor flow path 219 may maintain a secured state until the level of the cooling water in the pressurization space 215 does not rise higher than the upper end of the vapor induction path securing pipe body 217 inside the lower cylinder 214, and the water vapor introduced into the pressurization space 215 may be supplied to the condensation space 213 through the vapor flow path 219.

The water vapor supplied to the condensation space 213 may pressurize the cooling water in the condensation space 213 so that the water level of the cooling water in the condensation space 213 decreases.

In addition, the water vapor supplied to the condensation space 213 may be condensed on the wall surface of the cooling water storage tank 212 which is a relatively low temperature in the condensation space 213, reduced to a liquid state, and reduced to cooling water.

After the cooling water condensing step S190, the pressure transition step S140, the first cooling water rising step S150, the second cooling water rising step S160, and the cooling water circulation step S170 can be sequentially circulated, and as the cooling water is circulated, the cooling water in the saturated vapor pressure cooling chamber is also continuously circulated, thereby continuously absorbing the heat of the second heat exchanger 134 of the emergency cooling flow passage 130 to continuously cool the heat in the nuclear reactor 122.

As described above, preferred embodiments according to the present invention have been examined, and it is obvious to those skilled in the art that the present invention can be embodied in other specific forms without departing from the spirit or scope of the invention in addition to the above-described embodiments. Therefore, the above-described embodiments are to be construed as illustrative rather than restrictive, and accordingly, the present invention is not limited to the above description and may be modified within the scope of the appended claims and their equivalents.

What is claimed is:

1. A passive cooling system for a nuclear reactor, the system comprising:

an energy release space containing a nuclear reactor with a reactor core;

an energy absorbing space which is partitioned from the energy release space, accommodating cooling water, and to which a pressure in the energy release space is transferred;

an energy transfer space provided above the energy absorbing space and receiving cooling water from the energy absorbing space, and absorbing and cooling heat transferred from the nuclear reactor vessel through the cooling water;

an emergency cooling flow passage for transferring heat of the nuclear reactor to the energy transfer space, the emergency cooling flow passage having a first heat exchanger and a second heat exchanger;

a reactor thermal insulation vessel spaced from the nuclear reactor and formed to surround an upper side and a circumference of the nuclear reactor;

a pressure equalization pipe that communicates the reactor thermal insulation vessel and the energy absorbing space to transfer water vapor and pressure in the reactor thermal insulation vessel to the energy absorbing space;

a coolant spray pipe for flowing pressurized cooling water in the energy absorbing space by the pressure equalization pipe to the energy transfer space;

wherein the energy transfer space comprises:

a saturated vapor pressure cooling chamber formed adjacent to an inner surface of the energy transfer space, forming a space containing the second heat exchanger of the emergency cooling flow passage and a cooling water discharge end of the coolant spray pipe, and filled with cooling water flowing from the cooling water discharge end; and a reference pressure chamber spaced inward from an inner surface of the saturated vapor pressure cooling chamber, with a lower side of the reference pressure chamber communicating with the saturated vapor pressure chamber, filled with air to achieve a pressure balance with cooling water of the saturated vapor pressure cooling chamber, and having a water level that changes in accordance with a pressure in the saturated vapor pressure cooling chamber;

wherein a siphon cooling water recirculation pipe for guiding the cooling water in the reference pressure chamber into the reactor thermal insulation vessel is provided, and wherein the siphon cooling water recirculation pipe, formed in an inverted U-shape, has a suction end of the upper side located in the reference pressure chamber and a discharge end of the lower side located at the lower side of the reactor thermal insulation vessel, with the suction end directed downward, extending upward, and then bending and extending downward.

2. The system of claim 1, wherein the energy absorbing space and the energy transfer space are located adjacent to one side of the energy release space.

3. The system of claim 1, wherein the energy absorbing space and the energy transfer space are formed to surround the outer circumference of the energy release space, and the energy release space is located inside the energy absorbing space and the energy release space.

4. The system of claim 1, wherein the energy absorbing space comprises:

a cooling water storage tank positioned below the reference pressure chamber and storing cooling water; and a lower cylinder formed on the upper side of the cooling water storage tank, forming a space condensing water vapor of the nuclear reactor thermal insulation vessel delivered through the pressure equalization pipe, extending a certain distance from the upper side toward the lower side of the energy absorbing space at a position spaced inward by a predetermined distance from a side wall of the cooling water storage tank to form a pressurization space that applies pressure so that cooling water in the cooling water storage tank flows through the coolant spray pipe to the energy transfer space by the pressure of the water vapor, and having the lower side communicating with the cooling water storage tank.

5. The system of claim 1, wherein the emergency cooling flow passage comprises:

the first heat exchanger that absorbs heat in the nuclear reactor vessel; and the second heat exchanger provided in the saturated vapor pressure cooling chamber and configured to release heat absorbed in the first heat exchanger;

wherein an outlet end of the coolant spray pipe is configured to spray cooling water in the energy absorbing space to the second heat exchanger.

6. The system of claim 4, wherein the energy absorbing space further comprises a vapor induction path securing pipe body for securing a vapor flow path for the water vapor in the pressurization space to move between the lower cylinder and the inner surface of the cooling water storage tank.

7. The system of claim 6, wherein the vapor induction path securing pipe body is formed to extend downward more than the lower end of the lower cylinder in a state of being spaced apart by a predetermined distance from the outer circumference surface of the lower cylinder at the outside of the lower cylinder, and to extend upward while being spaced apart by a predetermined distance from the inner circumference surface of the lower cylinder after being bent from the lower side of the lower cylinder toward the inside of the lower cylinder, and to secure a vapor flow path between the lower cylinder and thereof.

8. The system of claim 1, further comprising a siphon air discharge pipe formed to discharge a gas in the siphon cooling water recirculation pipe to the reference pressure chamber, a discharge end thereof being located higher than the uppermost end of the siphon cooling water recirculation pipe.

9. The system of claim 1, further comprising:

a blocking wall that partitions a space between a side surface of the reactor thermal insulation vessel on the upper side of the discharge end of the siphon cooling water recirculation pipe and an inner surface of the energy release space to block cooling water from flowing into the space between the side surface of the reactor thermal insulation vessel and the inner surface of the energy release space; and an air release valve provided in the blocking wall and configured to release non-condensed gas inside the space surrounded by the reactor thermal insulation vessel and the blocking wall to the energy release space.

10. The system of claim 1, further comprising a starting cooling water supply unit disposed on the upper side of the reactor thermal insulation vessel and configured to supply a predetermined amount of cooling water into the reactor thermal insulation vessel when the temperature and the pressure in the energy release space are increased by a certain amount or more.

11. The system of claim 4, wherein a cross-sectional area between the cooling water storage tank and the lower cylinder is formed to be smaller than a cross-sectional area within the lower cylinder.

12. A method for operating a passive cooling system for a nuclear reactor, the method comprising:

a pressure rising step of raising the temperature and pressure in a reactor thermal insulation vessel provided in an energy release space raised above a set value due to the temperature rise in the reactor thermal insulation vessel;

a cooling step of transferring heat of a nuclear reactor to an energy transfer space through an emergency cooling flow passage and cooling the heat with cooling water in the energy transfer space;

a pressure transition step transferring water vapor pressure in the reactor thermal insulation vessel provided in the energy release space to an energy absorbing space through a pressure equalization pipe;

a first cooling water rising step of raising and moving cooling water in the energy absorbing space through a coolant spray pipe to a saturated vapor pressure cooling chamber containing the emergency cooling flow passage, by water vapor pressure in the energy absorbing space raised by the above pressure transition step;

a second cooling water rising step of flowing cooling water from the first cooling water rising step into the reference pressure chamber to raise the water level inside the reference pressure chamber;

a cooling water circulation step injecting cooling water to the reactor thermal insulation vessel by the siphon cooling water recirculation pipe, in response to the water level of the cooling water flowing into the reference pressure chamber from the second cooling water rising step being higher than a siphon cooling water recirculation pipe; and a cooling water condensing step of vaporizing and expanding cooling water injected to the reactor thermal insulation vessel from the cooling water circulation step by heat of the nuclear reactor to raise water vapor pressure, moving the pressurized water vapor by the pressure equalization pipe to the energy absorbing space, and condensing the water vapor in the energy absorbing space.

13. The method of claim 12, further comprising a starting pressure forming step for forming a predetermined amount of water vapor pressure into the reactor thermal insulation vessel when the temperature and pressure in the reactor thermal insulation vessel are raised in the pressure rising step.

14. The method of claim 13, wherein the starting pressure forming step further comprises opening a starting valve of a starting cooling water supply unit to inject cooling water stored in a water tank of the start cooling water supply unit into the reactor thermal insulation vessel, vaporizing and expanding the injected cooling water by heat of the nuclear reactor to form the water vapor pressure.

15. The method of claim 13, wherein the starting pressure forming step further comprising forming the water vapor pressure by opening a vapor release valve to release water vapor in the emergency cooling flow passage into the reactor thermal insulation vessel.

16. The method of claim 12, further comprising an air release step of opening an air release valve to release non-condensed gas inside the reactor thermal insulation vessel to the energy release space.

* * * * *